United States Patent
Ochiai

(10) Patent No.: US 12,018,872 B2
(45) Date of Patent: Jun. 25, 2024

(54) REFRIGERATION CYCLE APPARATUS

(71) Applicant: Mitsubishi Electric Corporation, Tokyo (JP)

(72) Inventor: Yasutaka Ochiai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 478 days.

(21) Appl. No.: 17/419,834

(22) PCT Filed: Feb. 28, 2019

(86) PCT No.: PCT/JP2019/007738
§ 371 (c)(1),
(2) Date: Jun. 30, 2021

(87) PCT Pub. No.: WO2020/174639
PCT Pub. Date: Sep. 3, 2020

(65) Prior Publication Data
US 2022/0082313 A1 Mar. 17, 2022

(51) Int. Cl.
F25B 49/02 (2006.01)
F25B 13/00 (2006.01)
F25B 41/20 (2021.01)

(52) U.S. Cl.
CPC .............. *F25B 49/02* (2013.01); *F25B 13/00* (2013.01); *F25B 41/20* (2021.01)

(58) Field of Classification Search
CPC .......... F25B 49/02; F25B 13/00; F25B 41/20; F25B 2313/006; F25B 2313/0231;
(Continued)

(56) References Cited

U.S. PATENT DOCUMENTS 10,684,043 B2 * 6/2020 Okano et al. .......... F24F 11/84
2014/0238060 A1   8/2014 Tamaki et al.
(Continued)

FOREIGN PATENT DOCUMENTS

CN    106352472 A     1/2017
JP    H04363552 A  * 12/1992  ............... F25B 1/00
(Continued)

OTHER PUBLICATIONS

JP 2002071188 A Translation (Year: 2002).*
(Continued)

*Primary Examiner* — Elizabeth J Martin
*Assistant Examiner* — Dario Antonio Deleon
(74) *Attorney, Agent, or Firm* — Posz Law Group, PLC

(57) ABSTRACT

During operation of a compressor, an indoor heat exchanger operates as a condenser, a first valve between a second junction portion and a refrigerant flow switching device is closed, and a second valve in a bypass pipe connecting a first junction portion and the second junction portion is opened, a refrigeration cycle apparatus detects an abnormality when a temperature obtained by subtracting a temperature of refrigerant at a gas portion of the indoor heat exchanger measured by a third temperature sensor from a saturation temperature obtained by converting a condensing pressure of the refrigerant is larger than a first threshold temperature, or when a temperature obtained by subtracting a temperature in a room measured by a first temperature sensor from a temperature of refrigerant at a liquid portion of the indoor heat exchanger measured by a second temperature sensor is smaller than a second threshold temperature.

20 Claims, 9 Drawing Sheets

(58) Field of Classification Search
CPC ...... F25B 2313/0314; F25B 2600/0253; F25B 2600/2507; F25B 2600/2513; F25B 2600/2519; F25B 2700/1931; F25B 2700/1933; Y02B 30/70
See application file for complete search history.

(56) References Cited

U.S. PATENT DOCUMENTS

| | | | | |
|---|---|---|---|---|
| 2017/0268811 | A1* | 9/2017 | Okazaki et al. | F25B 49/02 |
| 2018/0347875 | A1* | 12/2018 | Nakajima et al. | F25B 41/335 |
| 2019/0154322 | A1* | 5/2019 | Ito et al. | F25B 45/00 |
| 2020/0064040 | A1* | 2/2020 | Koike et al. | F25B 49/022 |
| 2020/0191447 | A1* | 6/2020 | Tanaka et al. | F25B 49/02 |
| 2020/0348064 | A1* | 11/2020 | Takenaka et al. | F25B 13/00 |

FOREIGN PATENT DOCUMENTS

| | | | | |
|---|---|---|---|---|
| JP | 2000-274896 A | | 10/2000 | |
| JP | 2002-071188 A | | 3/2002 | |
| JP | 2002071188 A | * | 3/2002 | ............ F24F 11/02 |
| JP | 2016-508590 A | | 3/2016 | |
| JP | 2016508590 A | * | 3/2016 | ............ F25B 49/00 |
| JP | 2017-154521 A | | 9/2017 | |

OTHER PUBLICATIONS

JP H04363552 A Translation (Year: 1992).*
JP 2016508590 A Translation (Year: 2016).*
Office Action dated Mar. 15, 2022 issued in corresponding JP patent application No. 2021-501478 (and English translation).
International Search Report of the International Searching Authority mailed May 21, 2019 for the corresponding International application No. PCT/JP2019/007738 (and English translation).

* cited by examiner

FIG. 2

|  | STATE PATTERN 1 | STATE PATTERN 2 | STATE PATTERN 3 | STATE PATTERN 4 |
|---|---|---|---|---|
|  | NORMAL | ELECTRONIC EXPANSION VALVE 21 LOCKED IN CLOSED POSITION | LOW PRESSURE VALVE 45 LOCKED IN OPENED POSITION | HIGH PRESSURE VALVE 46 LOCKED IN CLOSED POSITION |
| STATE OF ELECTRONIC EXPANSION VALVE 21 | DEGREE-OF-SUBCOOLING CONTROL | CLOSED | DEGREE-OF-SUBCOOLING CONTROL | DEGREE-OF-SUBCOOLING CONTROL |
| STATE OF LOW PRESSURE VALVE 45 | CLOSED | CLOSED | OPENED | CLOSED |
| STATE OF HIGH PRESSURE VALVE 46 | OPENED | OPENED | OPENED | CLOSED |

FIG. 3

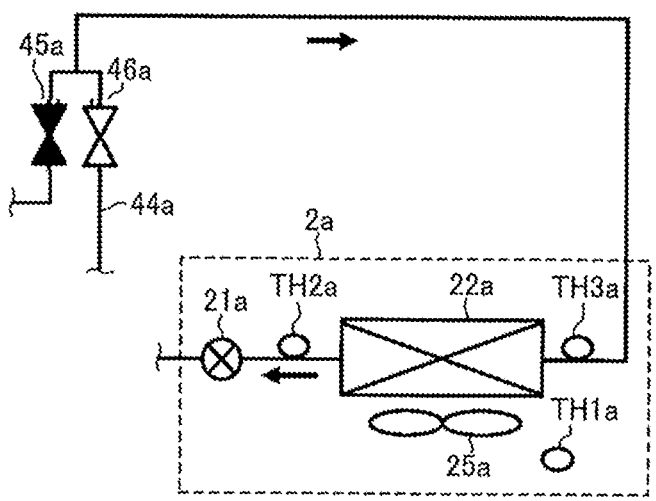

REFRIGERANT OUTLET OF INDOOR HEAT EXCHANGER 22

REFRIGERANT INLET OF INDOOR HEAT EXCHANGER 22

REFRIGERATION CYCLE APPARATUS

CROSS REFERENCE TO RELATED APPLICATION

This application is a U.S. national stage application of International Patent Application No. PCT/JP2019/007738 filed on Feb. 28, 2019, the disclosure of which is incorporated herein by reference.

TECHNICAL FIELD

The present disclosure relates to a refrigeration cycle apparatus including a refrigeration cycle circuit, and in particular, relates to abnormality detection for a valve in the circuit.

BACKGROUND

A known air-conditioning apparatus detects an abnormality at an expansion valve by itself (refer to Patent Literature 1, for example). This air-conditioning apparatus includes a compressor, a condenser, an electronic expansion valve, and an evaporator. A temperature sensor configured to measure a temperature in the evaporator is provided between the electronic expansion valve and the evaporator. In addition, a temperature sensor configured to measure a temperature of suctioned air is provided at an air inlet of the evaporator. An abnormality detector performs abnormality detection for the electronic expansion valve on the basis of temperatures measured by the temperature sensors.

Patent Literature

Patent Literature 1: Japanese Unexamined Patent Application Publication No. 2000-274896

For example, a multifunctional refrigeration cycle apparatus capable of performing a cooling and heating mixed operation includes a plurality of indoor heat exchangers and two solenoid valves for each of the indoor heat exchangers to switch between refrigerant flow directions in the indoor heat exchanger. In such a refrigeration cycle apparatus configured such that an electronic expansion valve and two solenoid valves are provided for each indoor heat exchanger, it may be difficult to accurately detect an abnormality at any of the electronic expansion valve and the two solenoid valves.

SUMMARY

The present disclosure is intended to solve the above-described problem and aims to provide a refrigeration cycle apparatus configured to detect an abnormality at a valve more accurately.

An embodiment of the present disclosure provides a refrigeration cycle apparatus including a refrigeration cycle circuit connecting a compressor, a refrigerant flow switching device, an outdoor heat exchanger, an expansion valve, and an indoor heat exchanger, the refrigeration cycle circuit being configured to circulate refrigerant; a first junction portion provided between the outdoor heat exchanger and the expansion valve, the first junction portion being configured to divide the refrigerant; a second junction portion provided between the indoor heat exchanger and the refrigerant flow switching device, the second junction portion being configured to divide the refrigerant; a bypass pipe connecting the first junction portion and the second junction portion, the bypass pipe being configured to cause the refrigerant to flow through the bypass pipe; a first valve provided between the second junction portion and the refrigerant flow switching device; a second valve provided to the bypass pipe; a first temperature sensor configured to measure a temperature in a room to which air passing through the indoor heat exchanger is provided; a second temperature sensor configured to measure a temperature of refrigerant at a liquid portion of the indoor heat exchanger; and a third temperature sensor configured to measure a temperature of refrigerant at a gas portion of the indoor heat exchanger. In an operation status in which the compressor operates, the indoor heat exchanger operates as a condenser, the first valve is closed, and the second valve is opened, when a temperature obtained by subtracting a temperature measured by the third temperature sensor from a saturation temperature obtained by converting a condensing pressure of the refrigerant is larger than a first threshold temperature that is predetermined, or when a temperature obtained by subtracting a temperature measured by the first temperature sensor from a temperature measured by the second temperature sensor is smaller than a second threshold temperature, the refrigeration cycle apparatus is configured to detect an abnormality at at least one of the expansion valve and the second valve.

In an operation status in which the compressor operates, the indoor heat exchanger operates as a condenser, the first valve is closed, and the second valve is opened, an abnormality at at least one of the expansion valve and the second valve causes a temperature measured by the third temperature sensor to be lower than a saturation temperature equal to a condensing temperature. According to an embodiment of the present disclosure, therefore, an abnormality at at least one of the expansion valve and the second valve is detected more accurately by determining at least one of that a temperature obtained by subtracting a temperature measured by the third temperature sensor from a saturation temperature obtained by converting a condensing pressure of the refrigerant is larger than the predetermined first threshold temperature and that a temperature obtained by subtracting a temperature measured by the first temperature sensor from a temperature measured by the second temperature sensor is smaller than the second threshold temperature.

BRIEF DESCRIPTION OF DRAWINGS

FIG. 2 is a diagram illustrating exemplary patterns of combinations of states that an electronic expansion valve 21a, a low pressure valve 45a, and a high pressure valve 46a may be in the refrigeration cycle apparatus according to Embodiment 1 of the present disclosure.

FIG. 3 is a diagram illustrating operations of the electronic expansion valve 21a, the low pressure valve 45a, and the high pressure valve 46a in State Pattern 1 in the refrigeration cycle apparatus according to Embodiment 1 of the present disclosure.

DESCRIPTION OF EMBODIMENTS

Figure 1:
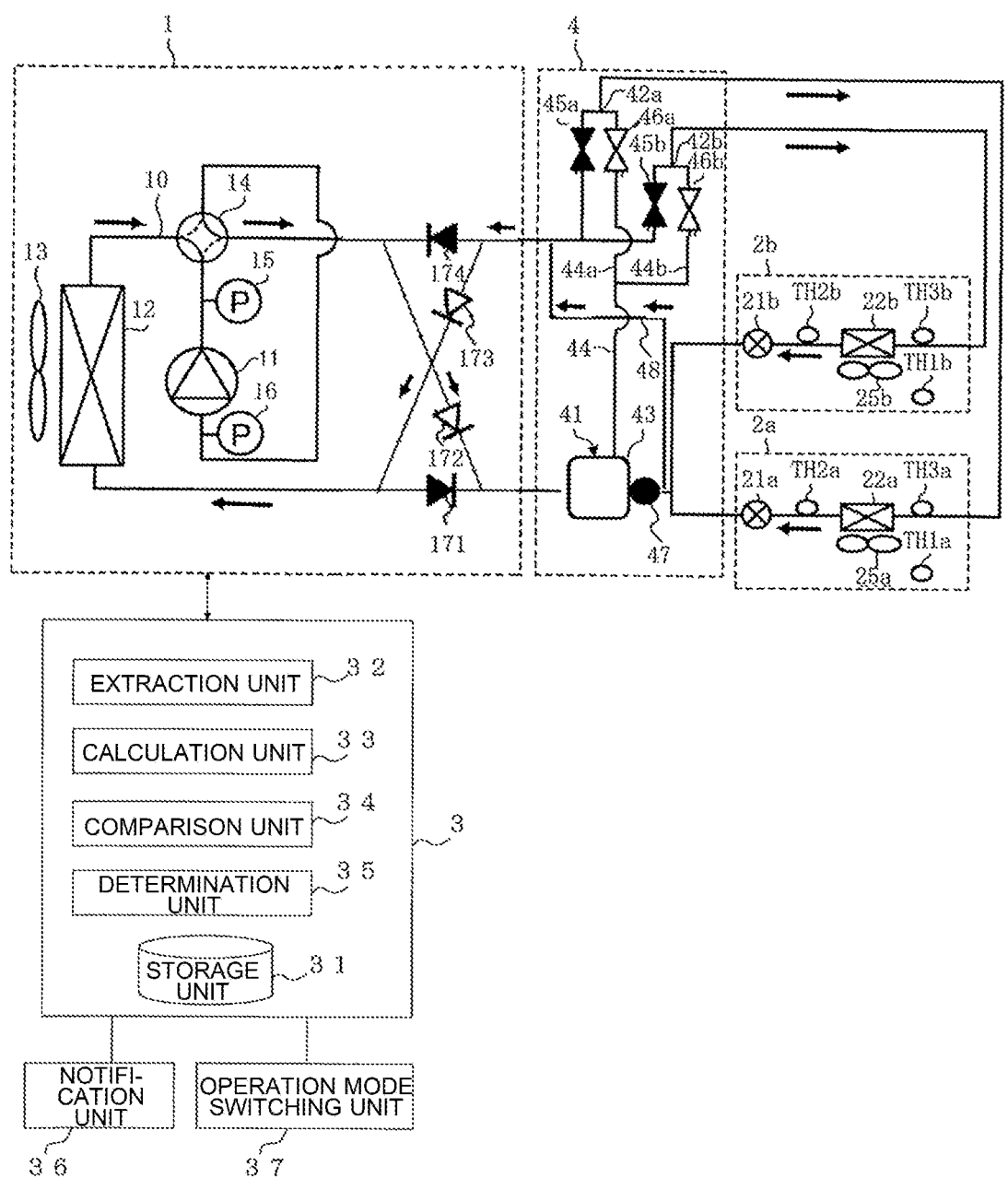
FIG. 1 is a diagram illustrating the configuration of a refrigeration cycle apparatus according to Embodiment 1 of the present disclosure.

A refrigeration cycle apparatus according to an embodiment of the present disclosure will be described below with reference to the drawings, for example. Note that components designated by the same reference signs in the drawings are the same components or equivalents. This note applies to the entire description of embodiments described below. Furthermore, note that the relationship between the sizes of components in the drawings may differ from that between the actual sizes of the components. Additionally, note that the forms of the components described herein are intended to be illustrative only and the forms of the components are not intended to be limited to those described herein. In particular, combinations of the components are not intended to be limited only to those in the embodiments. A component in one embodiment can be used in another embodiment. High and low values of, for example, temperature and pressure, are not determined in relation to particular absolute values but are relatively determined on the basis of, for example, a status or an operation of, for example, the apparatus. For a plurality of devices of the same type distinguished from one another using, for example, letters, if the devices do not have to be distinguished from one another or specified, the letters may be omitted.

Embodiment 1

FIG. 1 is a diagram illustrating the configuration of a refrigeration cycle apparatus according to Embodiment 1 of the present disclosure. In Embodiment 1, a multifunctional air-conditioning apparatus capable of performing a cooling and heating mixed operation is illustrated as an exemplary refrigeration cycle apparatus. As illustrated in FIG. 1, the refrigeration cycle apparatus according to Embodiment 1 includes a refrigeration cycle circuit 10 configured to circulate refrigerant and a controller 3 configured to control the entire refrigeration cycle apparatus including the refrigeration cycle circuit 10. In Embodiment 1, as illustrated in FIG. 1, the refrigeration cycle apparatus includes an outdoor unit 1, an indoor unit 2a, an indoor unit 2b, and a flow dividing controller 4. For example, components included in the refrigeration cycle circuit 10 are separated and held in the outdoor unit 1, the indoor units 2a and 2b, and the flow dividing controller 4.

The refrigeration cycle circuit 10 includes a compressor 11, a refrigerant flow switching device 14, an outdoor heat exchanger 12, an electronic expansion valve 21a, an electronic expansion valve 21b, an indoor heat exchanger 22a, and an indoor heat exchanger 22b, which are connected in a loop by refrigerant pipes. In the refrigeration cycle circuit 10, a combination of the electronic expansion valve 21a and the indoor heat exchanger 22a and a combination of the electronic expansion valve 21b and the indoor heat exchanger 22b are connected in parallel with each other. Although the number of combinations each including the electronic expansion valve 21 and the indoor heat exchanger 22 is two in Embodiment 1, the number of combinations each including the electronic expansion valve 21 and the indoor heat exchanger 22 may be one or three or more.

The refrigeration cycle circuit 10 is connected to a bypass passage 44 including a bypass pipe configured to cause the refrigerant to bypass the electronic expansion valves 21a and 21b and the indoor heat exchangers 22a and 22b and flow through the bypass pipe. One end of the bypass passage 44 is connected to a first junction portion 41 provided between the outdoor heat exchanger 12 and the electronic expansion valves 21a and 21b in the refrigeration cycle circuit 10. The first junction portion 41 includes a gas-liquid separator 43.

The other end of the bypass passage 44 branches out into multiple branch passages, namely a branch passage 44a and a branch passage 44b each including a branch pipe. The branch passage 44a and the branch passage 44b are respectively provided for the indoor unit 2a and the indoor unit 2b, which will be described later. The branch passages 44a and 44b are equal in number to the indoor units 2a and 2b, or the indoor heat exchangers 22a and 22b. The branch passage 44a is connected to a second junction portion 42a provided between the indoor heat exchanger 22a and the refrigerant flow switching device 14 in the refrigeration cycle circuit 10. The branch passage 44b is connected to a second junction portion 42b provided between the indoor heat exchanger 22b and the refrigerant flow switching device 14 in the refrigeration cycle circuit 10. The second junction portions 42a and 42*b* are provided for the indoor units 2*a* and 2*b*, respectively. The second junction portions 42*a* and 42*b* are equal in number to the indoor units 2*a* and 2*b*, or the indoor heat exchangers 22*a* and 22*b*.

A low pressure valve 45*a* is provided between the second junction portion 42*a* and the refrigerant flow switching device 14 in the refrigeration cycle circuit 10. In addition, a low pressure valve 45*b* is provided between the second junction portion 42*b* and the refrigerant flow switching device 14 in the refrigeration cycle circuit 10. Each of the low pressure valves 45*a* and 45*b*, through which low pressure refrigerant mainly passes, is an example of a first valve in the present disclosure. The low pressure valves 45*a* and 45*b* are provided for the indoor units 2*a* and 2*b*, respectively. The low pressure valves 45*a* and 45*b* are equal in number to the indoor units 2*a* and 2*b*, or the indoor heat exchangers 22*a* and 22*b*.

A high pressure valve 46*a* is provided between the branch passage 44*a* of the bypass passage 44 and the second junction portion 42*a*. In addition, a high pressure valve 46*b* is provided between the branch passage 44*b* of the bypass passage 44 and the second junction portion 42*b*. Each of the high pressure valves 46*a* and 46*b*, through which high pressure refrigerant mainly passes, is an example of a second valve in the present disclosure. The high pressure valves 46*a* and 46*b* are provided for the indoor units 2*a* and 2*b*, respectively. The high pressure valves 46*a* and 46*b* are equal in number to the indoor units 2*a* and 2*b*, or the indoor heat exchangers 22*a* and 22*b*.

As described above, the refrigeration cycle apparatus includes the outdoor unit 1, the flow dividing controller 4, and the two indoor units 2*a* and 2*b*. The devices in the outdoor unit 1 are connected to the devices in the flow dividing controller 4 by two refrigerant pipes. Furthermore, the devices in the flow dividing controller 4 are connected to the devices in each of the indoor units 2*a* and 2*b* by two refrigerant pipes. Although the single outdoor unit 1 is illustrated in Embodiment 1, the number of outdoor units 1 may be two or more. In addition, although the single flow dividing controller 4 is illustrated in Embodiment 1, the number of flow dividing controllers 4 may be two or more. Additionally, although the two indoor units 2*a* and 2*b* are illustrated in Embodiment 1, the number of indoor units 2 may be one or three or more. The outdoor unit 1 may be connected to the flow dividing controller 4 by three refrigerant pipes.

The outdoor unit 1 is installed outside, for example, a building. The outdoor unit 1 holds the compressor 11, the refrigerant flow switching device 14, the outdoor heat exchanger 12, which are described above, and check valves 171 to 174. The outdoor unit 1 further holds an outdoor fan 13, a high-pressure-side pressure sensor 15, and a low-pressure-side pressure sensor 16.

The compressor 11 is fluid machinery configured to suction low pressure and low temperature gas refrigerant, compress the refrigerant into high pressure and high temperature gas refrigerant, and discharge the refrigerant. As the compressor 11 operates, the refrigerant is circulated through the refrigeration cycle circuit 10. As the compressor 11, an inverter driven compressor whose operating frequency is adjustable is used. The operation of the compressor 11 is controlled by the controller 3.

The refrigerant flow switching device 14 is a valve configured to switch between a refrigerant flow direction in a cooling main operation and a refrigerant flow direction in a heating main operation. The refrigerant flow switching device 14 is controlled by the controller 3 such that passages represented by solid lines in FIG. 1 are set in the cooling main operation and passages represented by broken lines in FIG. 1 are set in the heating main operation. The cooling main operation is an operation mode that is used when a cooling load is larger than a heating load in the indoor units 2*a* and 2*b*. The cooling main operation is defined to include a cooling only operation in which all of the indoor units 2*a* and 2*b* each perform a cooling operation. The heating main operation is an operation mode that is used when the heating load is larger than the cooling load in the indoor units 2*a* and 2*b*. The heating main operation is defined to include a heating only operation in which all of the indoor units 2*a* and 2*b* each perform a heating operation. As the refrigerant flow switching device 14, for example, a four-way valve is used.

The outdoor heat exchanger 12 is a heat exchanger that operates as a condenser in the cooling main operation and operates as an evaporator in the heating main operation. The outdoor heat exchanger 12 exchanges heat between the refrigerant and outdoor air.

The check valve 171, the check valve 172, the check valve 173, and the check valve 174 determine a direction in which the refrigerant passes through the outdoor unit 1. The arrangement of the check valves 171 to 174 determines a passage through which the refrigerant flows from the outdoor unit 1 to the flow dividing controller 4 and a passage through which the refrigerant flows from the flow dividing controller 4 to the outdoor unit 1, irrespective of operation mode.

The outdoor fan 13 is configured to provide the outdoor air to the outdoor heat exchanger 12. As the outdoor fan 13, for example, a propeller fan that is driven by a motor (not illustrated) is used. As the outdoor fan 13 operates, the outdoor air is suctioned into the outdoor unit 1, passes through the outdoor heat exchanger 12, and is then discharged out of the outdoor unit 1. The operation of the outdoor fan 13 is controlled by the controller 3.

The high-pressure-side pressure sensor 15 is provided to a discharge pipe between the compressor 11 and the refrigerant flow switching device 14, or to a discharge port of the compressor 11, in the refrigeration cycle circuit 10. The high-pressure-side pressure sensor 15 is configured to measure a high-pressure-side pressure $Pd$, which is a discharge pressure of the compressor 11, on a high-pressure side of the refrigeration cycle circuit 10 and output a measurement signal to the controller 3. The controller 3 calculates a condensing temperature $Tc$ of the refrigerant in the refrigeration cycle circuit 10 on the basis of the high-pressure-side pressure $Pd$ in the refrigeration cycle circuit 10.

The low-pressure-side pressure sensor 16 is provided to a suction pipe between the refrigerant flow switching device 14 and the compressor 11, or to a suction port of the compressor 11, in the refrigeration cycle circuit 10. The low-pressure-side pressure sensor 16 is configured to measure a low-pressure-side pressure $Ps$ on a low-pressure side of the refrigeration cycle circuit 10 and output a measurement signal to the controller 3. The controller 3 calculates an evaporating temperature $Te$ of the refrigerant in the refrigeration cycle circuit 10 on the basis of the low-pressure-side pressure $Ps$ in the refrigeration cycle circuit 10.

The indoor unit 2*a* is installed inside the building, for example. The indoor unit 2*a* holds the electronic expansion valve 21*a* and the indoor heat exchanger 22*a*, which are described above. The indoor unit 2*a* further holds an indoor fan 25*a*, a first temperature sensor TH1*a*, a second temperature sensor TH2*a*, and a third temperature sensor TH3*a*.

The electronic expansion valve 21*a* is a valve configured to cause adiabatic expansion of the refrigerant. The opening degree of the electronic expansion valve 21a is controlled by the controller 3 such that the degree of superheat or the degree of subcooling SC of the refrigerant in the refrigeration cycle circuit 10 approaches a target value. The electronic expansion valve 21a is an example of an expansion device. As an expansion device, a fixed expansion device, such as a capillary tube, or a thermostatic expansion valve can be used instead of the electronic expansion valve 21a.

The indoor heat exchanger 22a is a heat exchanger that operates as an evaporator when the indoor unit 2a performs the cooling operation and operates as a condenser when the indoor unit 2a performs the heating operation. The indoor heat exchanger 22a exchanges heat between the refrigerant and indoor air.

The indoor fan 25a is configured to provide the indoor air to the indoor heat exchanger 22a. As the indoor fan 25a, for example, either of a centrifugal fan and a cross-flow fan, each of which is driven by a motor (not illustrated), is used in many cases. As the indoor fan 25a operates, the indoor air is suctioned into the indoor unit 2a and passes through the indoor heat exchanger 22a, and conditioned air leaving the indoor heat exchanger 22a is provided into a room. The operation of the indoor fan 25a is controlled by the controller 3.

The first temperature sensor TH1a is configured to measure a room temperature TH1 in the room to which conditioned air from the indoor unit 2a is provided and output provided at, for example, an air inlet of the indoor unit 2a, which is located upstream of the indoor heat exchanger 22a in a direction in which the indoor air flows.

The second temperature sensor TH2a is provided between the electronic expansion valve 21a and the indoor heat exchanger 22a in the refrigeration cycle circuit 10. The second temperature sensor TH2a is configured to measure a liquid-portion temperature TH2, which is a temperature of refrigerant at a liquid portion, through which liquid refrigerant flows, of the indoor heat exchanger 22a, and output a measurement signal to the controller 3. Therefore, the second temperature sensor TH2a measures a temperature of subcooled refrigerant at a refrigerant outlet port of the indoor heat exchanger 22a in the heating operation of the indoor unit 2a.

The third temperature sensor TH3a is provided between the indoor heat exchanger 22a and a combination of the low pressure valve 45a and the high pressure valve 46a in the refrigeration cycle circuit 10. The third temperature sensor TH3a is configured to measure a gas-portion temperature TH3, which is a temperature of refrigerant at a gas portion, through which gas refrigerant flows, of the indoor heat exchanger 22a, and output a measurement signal to the controller 3. Therefore, the third temperature sensor TH3a measures a temperature of superheated gas refrigerant at a refrigerant inlet port of the indoor heat exchanger 22a in the heating operation of the indoor unit 2a.

The indoor unit 2b has the same configuration as that of the indoor unit 2a. The indoor unit 2b holds the electronic expansion valve 21b, the indoor heat exchanger 22b, an indoor fan 25b, a first temperature sensor TH1b, a second temperature sensor TH2b, and a third temperature sensor TH3b.

The flow dividing controller 4 is installed inside the building, for example. The flow dividing controller 4 is a relay unit provided between the outdoor unit 1 and each of the indoor units 2a and 2b in the refrigerant flow direction. The flow dividing controller 4 holds the first junction portion 41, the second junction portions 42a and 42b, the gas-liquid separator 43, the bypass passage 44, the branch passages 44a and 44b, the low pressure valves 45a and 45b, the high pressure valves 46a and 46b, which are described above, and a valve 47 and a low pressure bypass passage 48.

The valve 47 is opened and closed to control flow of the refrigerant. For example, in the cooling only operation, the valve 47 is opened such that liquid refrigerant flows from the outdoor unit 1 to the indoor units 2a and 2b. For example, while the valve 47 is closed, gas refrigerant flowing from the outdoor unit 1 into the flow dividing controller 4 is provided to the indoor unit 2, which is at least one of the indoor units 2a and 2b, performing the heating operation through the gas-liquid separator 43 and the bypass passage 44. Liquid refrigerant leaving the indoor unit 2 passes through the low pressure bypass passage 48, which corresponds to a bypass pipe, for example.

Each of the low pressure valves 45a and 45b and the high pressure valves 46a and 46b is an on-off valve configured to open and close a passage. As the low pressure valves 45a and 45b and the high pressure valves 46a and 46b, for example, solenoid valves or motor-operated valves are used. The operations of the low pressure valves 45a and 45b and the high pressure valves 46a and 46b are controlled by the controller 3. While the indoor unit 2a is performing the cooling operation, the low pressure valve 45a is opened and the high pressure valve 46a is closed. While the indoor unit 2a is performing the heating operation, the low pressure valve 45a is closed and the high pressure valve 46a is opened. Similarly, while the indoor unit 2b is performing the cooling operation, the low pressure valve 45b is opened and the high pressure valve 46b is closed. While the indoor unit 2b is performing the heating operation, the low pressure valve 45b is closed and the high pressure valve 46b is opened.

The controller 3 includes a microcomputer including a central processing unit (CPU), a read only memory (ROM), a random access memory (RAM), and an input-output port. The controller 3 controls an operation of the entire refrigeration cycle apparatus on the basis of, for example, measurement signals from the various sensors provided in, for example, the refrigeration cycle circuit 10, and an operation signal from an operation unit (not illustrated). The controller 3 controls the devices such as the compressor 11, the refrigerant flow switching device 14, the outdoor fan 13, the electronic expansion valves 21a and 21b, the indoor fans 25a and 25b, the low pressure valves 45a and 45b, and the high pressure valves 46a and 46b. Although the controller 3 is provided to the outdoor unit 1 in Embodiment 1 as illustrated in FIG. 1, the controller 3 may be disposed in any place. For example, the controller 3 may be provided to either the indoor unit 2a or the indoor unit 2b or may be provided to the flow dividing controller 4. The controller 3 may be disposed independently.

The controller 3 in Embodiment 1 performs an abnormality determination process for detection of an abnormality, particularly at the electronic expansion valves 21a and 21b, the low pressure valves 45a and 45b, and the high pressure valves 46a and 46b. For this purpose, the controller 3 includes, as functional blocks, a storage unit 31, an extraction unit 32, a calculation unit 33, a comparison unit 34, and a determination unit 35. The storage unit 31 stores data on pressures measured by the high-pressure-side pressure sensor 15 and the low-pressure-side pressure sensor 16. Furthermore, the storage unit 31 stores data on temperatures measured by the first temperature sensors TH1a and TH1b, the second temperature sensors TH2a and TH2b, and the third temperature sensors TH3a and TH3b. The data is periodically obtained during operation of the refrigeration cycle circuit 10. Additionally, the storage unit 31 stores various pieces of data that are necessary for the controller 3 to perform the abnormality determination process.

The extraction unit 32 extracts data necessary for the abnormality determination process from the data stored in the storage unit 31. In this case, data obtained while the refrigeration cycle circuit 10 and the indoor unit 2a are operating in a specific operation status is used to detect an abnormality at the electronic expansion valve 21a, the low pressure valve 45a, and the high pressure valve 46a for the indoor unit 2a. The specific operation status for detection of an abnormality at the electronic expansion valve 21a, the low pressure valve 45a, and the high pressure valve 46a is an operation status in which the compressor 11 operates, the indoor heat exchanger 22a operates as a condenser, the low pressure valve 45a is closed, and the high pressure valve 46a is opened. For example, while the indoor unit 2a is in a thermo-on state in the heating operation, the refrigeration cycle circuit 10 and the indoor unit 2a are operating in the specific operation status. At this time, either the cooling main operation or the heating main operation may be performed in the refrigeration cycle circuit 10.

Similarly, data obtained while the refrigeration cycle circuit 10 and the indoor unit 2b is operating in a specific operation status is used to detect an abnormality at the electronic expansion valve 21b, the low pressure valve 45b, and the high pressure valve 46b for the indoor unit 2b. The specific operation status for detection of an abnormality at the electronic expansion valve 21b, the low pressure valve 45b, and the high pressure valve 46b is an operation status in which the compressor 11 operates, the indoor heat exchanger 22b operates as a condenser, the low pressure valve 45b is closed, and the high pressure valve 46b is opened. For example, while the indoor unit 2b is in the thermo-on state in the heating operation, the refrigeration cycle circuit 10 and the indoor unit 2b are operating in the specific operation status. At this time, either the cooling main operation or the heating main operation may be performed in the refrigeration cycle circuit 10. In Embodiment 1, as will be described later, the extraction unit 32 extracts data obtained in a specific operation that is performed in response to switching to an abnormality detection mode in an operation mode switching unit 37.

The calculation unit 33 performs necessary calculation on the basis of the data extracted by the extraction unit 32. The comparison unit 34 compares a value calculated by the calculation unit 33 with a threshold value or compares values calculated by the calculation unit 33.

The determination unit 35 performs, on the basis of a result of comparison by the comparison unit 34, the abnormality determination process for at least one of the electronic expansion valves 21a and 21b, the low pressure valves 45a and 45b, and the high pressure valves 46a and 46b.

Furthermore, a notification unit 36 and the operation mode switching unit 37 are connected to the controller 3. The notification unit 36 and the operation mode switching unit 37 may be included, as parts of the controller 3, in the controller 3. The notification unit 36 is configured to provide notification of various pieces of information on, for example, abnormalities at the electronic expansion valves 21a and 21b, the low pressure valves 45a and 45b, and the high pressure valves 46a and 46b, in response to an instruction from the controller 3. The notification unit 36 includes at least one of a display unit configured to visually provide notification of information and an audio output unit configured to audibly provide notification of information.

The operation mode switching unit 37 is configured to receive an operation-mode switching operation performed by a user and transmit a signal related to the operation to the controller 3. When an operation-mode switching operation is performed on the operation mode switching unit 37, the controller 3 switches between operation modes in response to a signal output from the operation mode switching unit 37. Operation modes of the refrigeration cycle apparatus according to Embodiment 1 include a normal operation mode and the abnormality detection mode. In the normal operation mode, the refrigeration cycle apparatus operates in an operation status in accordance with requests from the indoor units 2a and 2b. For example, the heating only operation is performed in response to heating requests from all of the indoor units 2a and 2b.

The abnormality detection mode is a mode to detect an abnormality at the electronic expansion valves 21a and 21b, the low pressure valves 45a and 45b, and the high pressure valves 46a and 46b. In the abnormality detection mode, therefore, the indoor unit 2a or the indoor unit 2b enters the thermo-on state in the heating operation irrespective of requests from the indoor units 2a and 2b. Even when the normal operation mode is being used, an abnormality at the electronic expansion valve 21a, the low pressure valve 45a, and the high pressure valve 46a can be detected as long as the indoor unit 2a is in the thermo-on state in the heating operation. Furthermore, even when the normal operation mode is being used, an abnormality at the electronic expansion valve 21b, the low pressure valve 45b, and the high pressure valve 46b can be detected as long as the indoor unit 2b is in the thermo-on state in the heating operation.

The heating main operation will be described below as an example of an operation of the refrigeration cycle apparatus. For the heating main operation, the refrigerant flow switching device 14 is switched such that the passages represented by the broken lines in FIG. 1 are set. The heating only operation in which all of the indoor units 2a and 2b each perform the heating operation will be described as an example. In FIG. 1, the flow of refrigerant in the heating only operation is represented by arrows. In the heating only operation, each of the low pressure valves 45a and 45b is closed and each of the high pressure valves 46a and 46b is opened. The opening degree of each of the electronic expansion valves 21a and 21b is adjusted such that the degree of subcooling SC at the outlet of the corresponding one of the indoor heat exchangers 22a and 22b approaches a target degree of subcooling SCm. For the low pressure valves 45a and 45b, the high pressure valves 46a and 46b, and the electronic expansion valves 21a and 21b, the opened valves are represented by open symbols and the closed valves are represented by filled symbols in FIG. 1 and FIGS. 3, 5, 7, and 9, which will be described later.

High temperature and high pressure gas refrigerant discharged from the compressor 11 passes through the refrigerant flow switching device 14, the check valve 172, the gas-liquid separator 43, and the high pressure valves 46a and 46b and enters the indoor heat exchangers 22a and 22b. In the heating main operation, the indoor heat exchangers 22a and 22b each operate as a condenser.

The gas refrigerant that has entered the indoor heat exchangers 22a and 22b exchanges heat with indoor air provided by the indoor fans 25a and 25b and thus condenses into high pressure liquid refrigerant. The refrigerant that has condensed in the indoor heat exchangers 22a and 22b passes through the low pressure bypass passage 48 and the check valve 173 and then evaporates and gasifies in the outdoor heat exchanger 12. After that, the refrigerant passes through the refrigerant flow switching device 14 and is then suctioned into the compressor 11.

High-pressure-side pressure constant control, which is exercised by the controller 3, will be described below. Such a multifunctional air-conditioning apparatus in Embodiment 1 needs to cause the indoor units 2a and 2b to perform the heating operation without lacking in capacity. The operating frequency of the compressor 11 is controlled such that the high-pressure-side pressure Pd in the refrigeration cycle circuit 10, or a discharge pressure of the compressor 11, is constant. Therefore, the condensing temperature Tc calculated on the basis of the high-pressure-side pressure Pd is a constant temperature.

Furthermore, outdoor fan control, which is exercised by the controller 3, will be described. In the heating main operation, the controller 3 controls the rotation frequency of the outdoor fan 13 such that the difference between the evaporating temperature Te and an outdoor air temperature is constant.

For steady-state control in the heating operation in the indoor units 2a and 2b, this control in the indoor unit 2a will be described as an example. In the refrigeration cycle circuit 10, the high-pressure-side pressure Pd is controlled to be constant. For this purpose, degree-of-subcooling control is exercised as a manner of changing the air-conditioning capacity of the indoor unit 2a. In the degree-of-subcooling control, the target degree of subcooling SCm for the degree of subcooling SC at the outlet of the indoor heat exchanger 22a is adjusted such that the indoor unit 2a has a desired air-conditioning capacity. The amount of heat exchange in the indoor heat exchanger 22a changes depending on the magnitude of the degree of subcooling SC. Therefore, adjusting the target degree of subcooling SCm for the degree of subcooling SC allows the indoor unit 2a to demonstrate an appropriate air-conditioning capacity. When a temperature difference between a preset temperature in the indoor unit 2a and the room temperature TH1 is large, the target degree of subcooling SCm for the degree of subcooling SC is set to a small value. When the temperature difference between the preset temperature in the indoor unit 2a and the room temperature TH1 is small, the target degree of subcooling SCm for the degree of subcooling SC is set to a large value. The opening degree of the electronic expansion valve 21a is controlled such that the degree of subcooling SC at the outlet of the indoor heat exchanger 22a approaches the target degree of subcooling SCm. Thus, a necessary amount of refrigerant is provided to the indoor heat exchanger 22a.

An abnormality at the electronic expansion valves 21, the low pressure valves 45, and the high pressure valves 46 in the refrigeration cycle apparatus according to Embodiment 1 will be described below. An example will be described below using the electronic expansion valve 21a, the indoor heat exchanger 22a, the first temperature sensor TH1a, the second temperature sensor TH2a, the third temperature sensor TH3a, the low pressure valve 45a, and the high pressure valve 46a for the indoor unit 2a.

FIG. 2 is a diagram illustrating exemplary patterns of combinations of states that the electronic expansion valve 21a, the low pressure valve 45a, and the high pressure valve 46a may be in the refrigeration cycle apparatus according to Embodiment 1 of the present disclosure. Herein, the refrigeration cycle apparatus is controlled to be in the above-described specific operation status in which the compressor 11 operates, the indoor heat exchanger 22a operates as a condenser, the low pressure valve 45a is closed, and the high pressure valve 46a is opened. In other words, the indoor unit 2a is in the heating operation. More properly speaking, the indoor unit 2a is in the thermo-on state in the heating operation. In this case, either the cooling main operation or the heating main operation may be performed in the refrigeration cycle circuit 10.

FIG. 3 is a diagram illustrating operations of the electronic expansion valve 21a, the low pressure valve 45a, and the high pressure valve 46a in State Pattern 1 in the refrigeration cycle apparatus according to Embodiment 1 of the present disclosure. As illustrated in FIGS. 2 and 3, each of the electronic expansion valve 21a, the low pressure valve 45a, and the high pressure valve 46a is in a normal state in State Pattern 1. The opening degree of the electronic expansion valve 21a is controlled on the basis of the degree of subcooling SC, the low pressure valve 45a is closed, and the high pressure valve 46a is opened. Thus, the indoor unit 2a performs heating.

Figure 4:
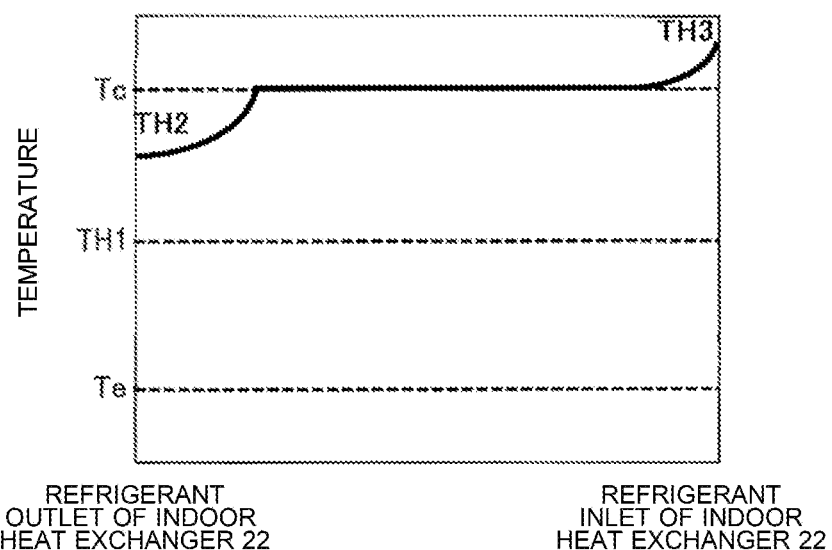
FIG. 4 is a diagram illustrating a graph showing a refrigerant temperature distribution in the indoor heat exchanger 22a in State Pattern 1 in the refrigeration cycle apparatus according to Embodiment 1 of the present disclosure.

FIG. 4 is a diagram illustrating a graph showing a refrigerant temperature distribution in the indoor heat exchanger 22a in State Pattern 1 in the refrigeration cycle apparatus according to Embodiment 1 of the present disclosure. The horizontal axis of FIG. 4 represents a position in a refrigerant passage in the indoor heat exchanger 22a. The vertical axis of FIG. 4 represents a temperature. The right end of the graph represents a refrigerant inlet of the indoor heat exchanger 22a in the heating operation. A temperature at the right end of the graph corresponds to the gas-portion temperature TH3, which is measured by the third temperature sensor TH3a, in the indoor heat exchanger 22a. The left end of the graph represents the refrigerant outlet of the indoor heat exchanger 22a in the heating operation. A temperature at the left end of the graph corresponds to the liquid-portion temperature TH2, which is measured by the second temperature sensor TH2a, in the indoor heat exchanger 22a.

In State Pattern 1, which is a normal condition, superheated gas refrigerant from the compressor 11 enters the indoor heat exchanger 22a, transfers heat to the indoor air, and thus condenses into subcooled liquid refrigerant. Then, the refrigerant flows out of the indoor heat exchanger 22a. The electronic expansion valve 21a is controlled such that the degree of subcooling SC in the indoor heat exchanger 22a approaches the target degree of subcooling SCm. Therefore, in State Pattern 1, which is the normal condition, the superheated gas refrigerant enters the refrigerant inlet of the indoor heat exchanger 22a, the refrigerant turns into subcooled liquid refrigerant at a portion in the indoor heat exchanger 22a, and the temperature of the refrigerant decreases as the refrigerant approaches the refrigerant outlet, as illustrated in FIG. 4. The subcooled liquid refrigerant flows from the refrigerant outlet of the indoor heat exchanger 22a. Thus, the gas-portion temperature TH3 is higher than the condensing temperature Tc calculated on the basis of the high-pressure-side pressure Pd (TH3>Tc). The liquid-portion temperature TH2 is the temperature of the subcooled liquid refrigerant, which is lower than the condensing temperature Tc (TH2<Tc).

Figure 5:
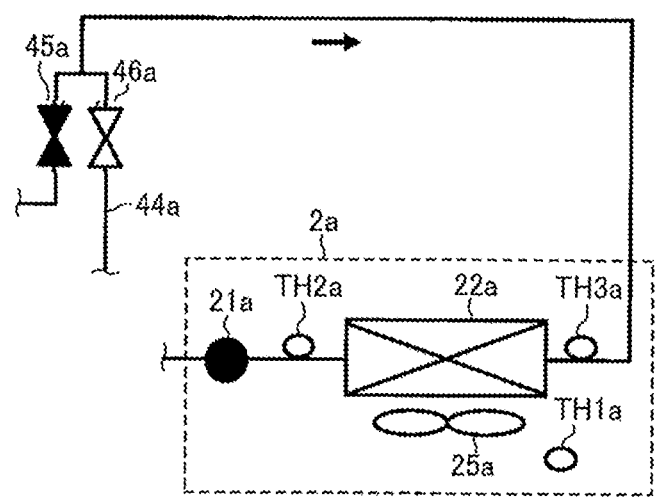
FIG. 5 is a diagram illustrating operations of the electronic expansion valve 21a, the low pressure valve 45a, and the high pressure valve 46a in State Pattern 2 in the refrigeration cycle apparatus according to Embodiment 1 of the present disclosure.

FIG. 5 is a diagram illustrating operations of the electronic expansion valve 21a, the low pressure valve 45a, and the high pressure valve 46a in State Pattern 2 in the refrigeration cycle apparatus according to Embodiment 1 of the present disclosure. As illustrated in FIGS. 2 and 5, State Pattern 2 is a condition where the electronic expansion valve 21a is locked in closed position. The electronic expansion valve 21a being locked in closed position is one of abnormalities at the electronic expansion valve 21a. Sticking of a valve body in the electronic expansion valve 21a causes the electronic expansion valve 21a to be locked in closed position. The electronic expansion valve 21a is controlled on the basis of the degree of subcooling SC in State Pattern 1, which is the normal condition, whereas the electronic expansion valve 21a is kept closed in State Pattern 2.

Figure 6:
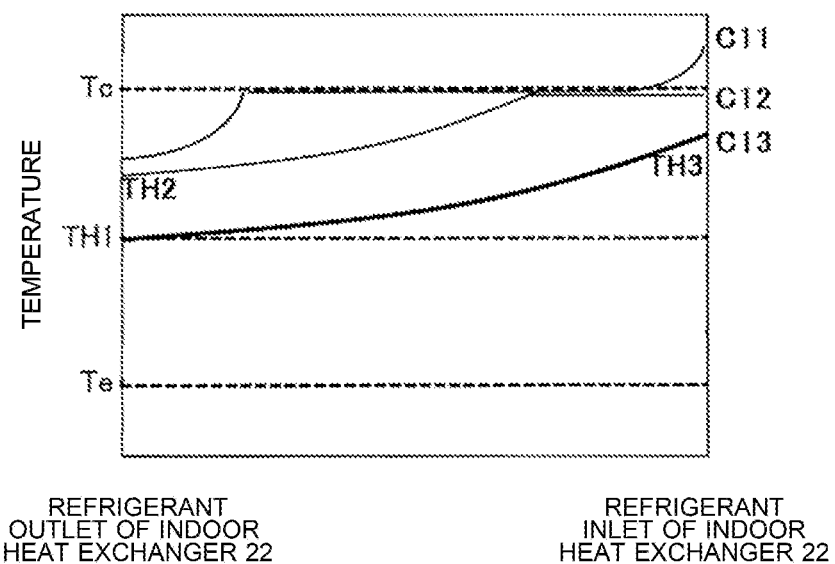
FIG. 6 is a diagram illustrating graphs each showing a refrigerant temperature distribution in the indoor heat exchanger 22a in State Pattern 2 in the refrigeration cycle apparatus according to Embodiment 1 of the present disclosure.

FIG. 6 is a diagram illustrating graphs each showing a refrigerant temperature distribution in the indoor heat exchanger 22a in State Pattern 2 in the refrigeration cycle apparatus according to Embodiment 1 of the present disclosure. The horizontal and vertical axes of FIG. 6 are the same as those of FIG. 4. A thick solid curve C13 represents a refrigerant temperature distribution observable after a lapse of sufficient time after transition from State Pattern 1 to State Pattern 2. A thin solid curve C11 represents a refrigerant temperature distribution observable immediately after the transition from State Pattern 1 to State Pattern 2. A thin solid curve C12 represents a time-based change in refrigerant temperature distribution from the temperature distribution represented by the curve C11 to the temperature distribution represented by the curve C13.

In State Pattern 1, which is the normal condition, the refrigerant is superheated gas at a portion where the third temperature sensor TH3a is disposed. When the electronic expansion valve 21a is locked into closed position and the condition shifts to State Pattern 2, the refrigerant accumulates in the indoor heat exchanger 22a. Consequently, two-phase refrigerant in the indoor heat exchanger 22a gradually turns into subcooled liquid by exchanging heat with the indoor air, so that the indoor heat exchanger 22a is gradually filled with the subcooled liquid. Thus, as illustrated in FIG. 6, the liquid-portion temperature TH2 decreases, approaches the room temperature TH1, and finally decreases to a temperature equal to the room temperature TH1. The gas-portion temperature TH3 also gradually falls because the proportion of a gas portion of the indoor heat exchanger 22a decreases. As represented by the curve C12 in FIG. 6, refrigerant at a portion associated with the gas-portion temperature TH3 enters a two-phase state and thus has a two-phase-portion temperature. As liquid refrigerant accumulates, refrigerant at the portion associated with the gas-portion temperature TH3 enters a subcooled liquid state as represented by the curve C13, and stabilizes at a temperature that differs from the room temperature TH1 by a constant temperature difference (TH3−TH1>constant value). The temperature difference changes depending on, for example, the cooling performance of the indoor heat exchanger 22 and the air flow rate through the indoor fan 25. Therefore, a threshold value needs to be set on the basis of, for example, the specifications of the indoor heat exchanger 22 and the air flow rate through the indoor fan 25 for a determination as to whether the condition is State Pattern 2. The liquid-portion temperature TH2 is equal to the room temperature TH1, and the gas-portion temperature TH3 differs from the liquid-portion temperature TH2 (TH1≤TH2<TH3).

The above-described temperature change in the indoor heat exchanger 22a in State Pattern 2 occurs in the case where the indoor heat exchanger 22a is filled with liquid refrigerant. For example, if the amount of refrigerant with which the refrigeration cycle circuit is filled is small, the indoor heat exchanger 22a may not be filled with liquid refrigerant even after a lapse of sufficient time. In such a case, as the temperature of refrigerant at a two-phase portion is detected as the gas-portion temperature TH3, the gas-portion temperature TH3 is equal to the condensing temperature Tc (TH3=Tc) and the liquid-portion temperature TH2 is equal to the room temperature TH1.

Figure 7:
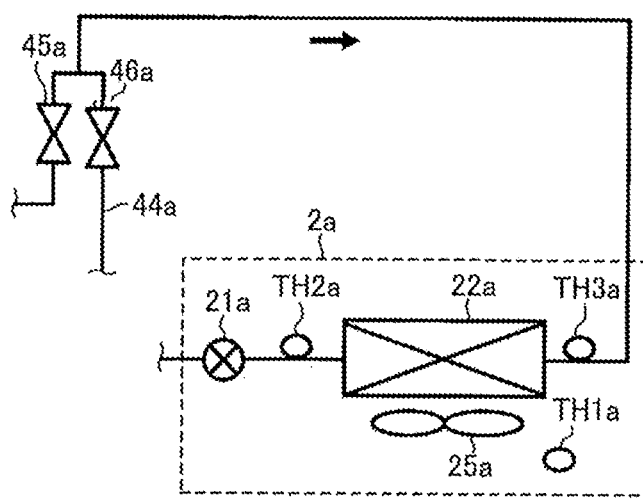
FIG. 7 is a diagram illustrating operations of the electronic expansion valve 21a, the low pressure valve 45a, and the high pressure valve 46a in State Pattern 3 in the refrigeration cycle apparatus according to Embodiment 1 of the present disclosure.

FIG. 7 is a diagram illustrating operations of the electronic expansion valve 21a, the low pressure valve 45a, and the high pressure valve 46a in State Pattern 3 in the refrigeration cycle apparatus according to Embodiment 1 of the present disclosure. As illustrated in FIGS. 2 and 7, State Pattern 3 is a condition where the low pressure valve 45a is locked in opened position. The low pressure valve 45a being locked in opened position is one of abnormalities at the low pressure valve 45a. Sticking of a valve body in the low pressure valve 45a causes the low pressure valve 45a to be locked in opened position. The low pressure valve 45a is closed in State Pattern 1, which is the normal condition, whereas the low pressure valve 45a is opened in State Pattern 3. If the low pressure valve 45a is locked in opened position during switching from the cooling operation to the heating operation in the indoor unit 2a, the low pressure valve 45a will fail to be closed. This results in State Pattern 3, rather than State Pattern 1.

Figure 8:
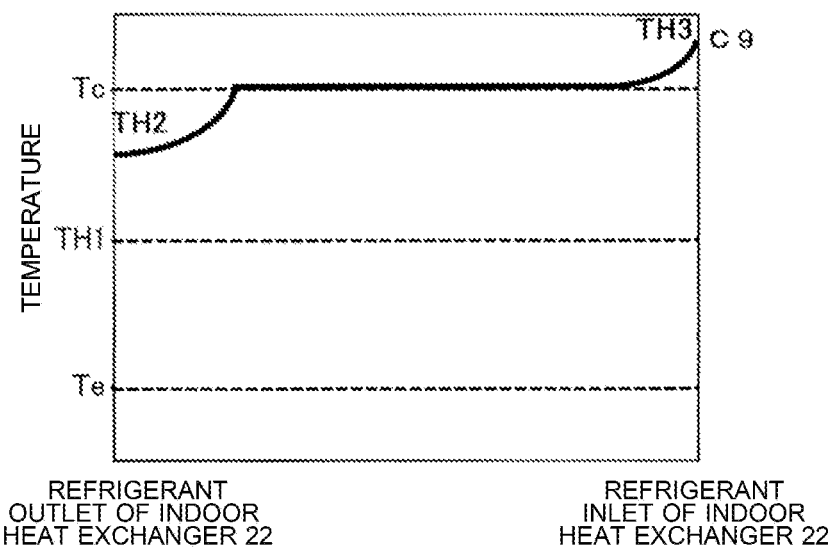
FIG. 8 is a diagram illustrating a graph showing a refrigerant temperature distribution in the indoor heat exchanger 22a in State Pattern 3 in the refrigeration cycle apparatus according to Embodiment 1 of the present disclosure.

FIG. 8 is a diagram illustrating a graph showing a refrigerant temperature distribution in the indoor heat exchanger 22a in State Pattern 3 in the refrigeration cycle apparatus according to Embodiment 1 of the present disclosure. The horizontal and vertical axes of FIG. 8 are the same as those of FIG. 4. A thick solid curve C9 represents a refrigerant temperature distribution observable after a lapse of sufficient time after transition to State Pattern 3. As illustrated in FIG. 8, the refrigerant temperature distribution in State Pattern 3 is the same as, for example, the refrigerant temperature distribution in State Pattern 1, which is the normal condition.

As the low pressure valve 45a is opened in State Pattern 3, part of high pressure refrigerant leaving the bypass passage 44 and the branch passage 44a enters a passage on the low-pressure side of the refrigeration cycle circuit 10. This results in an increase in low-pressure-side pressure Ps in the refrigeration cycle circuit 10. As the compressor 11 is controlled such that the high-pressure-side pressure Pd approaches a constant target pressure Pdm, the operating frequency of the compressor 11 increases as the low-pressure-side pressure Ps increases. In other words, the amount of refrigerant passing through the compressor 11 increases by the amount of refrigerant flowing through the bypass passage 44. If the high-pressure-side pressure Pd in the refrigeration cycle circuit 10 can be maintained at the target pressure Pdm by increasing the operating frequency of the compressor 11, the operating efficiency of the refrigeration cycle apparatus will decrease, but the indoor unit 2a may operate as in State Pattern 1, which is the normal condition, as illustrated in FIG. 8. However, a range of operating frequencies is set for the compressor 11 and the operating frequency of the compressor 11 cannot be set above a maximum operating frequency, which is an upper limit of the range of operating frequencies. If the high-pressure-side pressure Pd in the refrigeration cycle circuit 10 cannot be maintained at the target pressure Pdm by increasing the operating frequency of the compressor 11 up to the maximum operating frequency, the capacity of the indoor unit 2a will be reduced because of an increase in low-pressure-side pressure Ps.

In State Pattern 3, part of the refrigerant discharged from the compressor 11 bypasses the indoor units 2a and 2b and is suctioned into the compressor 11 without being provided to the indoor units 2a and 2b. Therefore, whether the condition is State Pattern 3 can be determined by comparing a refrigerant flow rate through the compressor 11 with the sum of refrigerant flow rates through the electronic expansion valves 21a and 21b of all of the indoor units 2a and 2b.

A refrigerant flow rate Groc through the compressor 11 can be calculated using, for example, the operating frequency of the compressor 11 and the density of refrigerant to be suctioned into the compressor 11. The following Equation (1) is an exemplary formula of the refrigerant flow rate Groc through the compressor 11. In the Equation (1), Groc is the refrigerant flow rate [kg/h] through the compressor 11, Vst is the displacement [m³] of the compressor 11, F is the operating frequency [Hz] (=[1/S]) of the compressor 11, ρs is the density [kg/m³] of refrigerant to be suctioned into the compressor 11, and ηv is the volumetric efficiency of the compressor 11 and is a constant value that satisfies 0≤ηv<1.

[Math. 1]

$$Groc = Vst \times F \times \rho s \times \eta v \times 3600 \qquad (1)$$

The sum ΣGric of refrigerant flow rates through the electronic expansion valves 21a and 21b is the sum of refrigerant flow rates Gric through the electronic expansion valves 21a and 21b. For example, the refrigerant flow rate Gric through the electronic expansion valve 21a can be calculated using, for example, a pressure difference between the high-pressure-side pressure Pd and the low-pressure-side pressure Ps in the refrigeration cycle circuit 10 and a Cv value of the electronic expansion valve 21a. The following Equation (2) is an exemplary formula of the refrigerant flow rate Gric through the electronic expansion valve 21a. In this equation, Gric is the refrigerant flow rate [kg/h] through the electronic expansion valve 21a, Cv is the Cv value of the electronic expansion valve 21a, ΔP is the pressure difference [MPa (abs)] between the high-pressure-side pressure Pd and the low-pressure-side pressure Ps in the refrigeration cycle circuit 10, and ρLEV is the density [kg/m³] of refrigerant at an inlet of the electronic expansion valve 21a.

[Math. 2]

$$Gric = 86.4 \times Cv \times (\Delta P \times \rho LEV)^{1/2} \qquad (2)$$

The above Equation (2) is obtained by multiplying the following Equation (3), which is a relational expression representing the relationship between the flow rate of fluid and the Cv value, by the density ρ, and is a transformation of the Equation (3). In this equation, the Cv value is one of flow coefficients of valves, for example. According to the Japanese Industrial Standards (JIS), the Cv value is defined as a numerical value representing the flow rate in US gallons per minute of clear water at 60 degrees F. that flows through a valve with a pressure difference of 1 [psi (pound-force per square inch)] over a specific travel distance (operating range). QL [m³/h] (h represents hour) is the flow rate of liquid. Furthermore, ΔP [MPa (abs)] is the difference between a primary (inlet) absolute pressure P1 and a secondary (outlet) absolute pressure P2. GL is the specific gravity of liquid when the specific gravity of water is 1, and is expressed as GL=ρ(ref)ρ(water), where ρ(ref) [kg/m³] is a refrigerant density and ρ(water) [kg/m³] is a water density=approximately 1000 [kg/m³].

[Math. 3]

$$QL = Cv / \{0.366 \times (GL/\Delta P)^{1/2}\} \qquad (3)$$

When the refrigerant flow rate Groc through the compressor 11 is larger than the sum ΣGric of the refrigerant flow rates through the electronic expansion valves 21a and 21b (Groc>ΣGric), it can be determined that the condition is State Pattern 3. If the refrigerant discharged from the compressor 11 is provided only to one indoor unit 2, whether the condition is State Pattern 3 can be determined using the refrigerant flow rate Groc through the compressor 11 and the refrigerant flow rate Gric through the electronic expansion valve 21. In other words, when the refrigerant flow rate Groc through the compressor 11 is larger than the refrigerant flow rate Gric through the electronic expansion valve 21a (Groc>Gric), it can be determined that the condition is State Pattern 3.

Furthermore, when a value obtained by subtracting the target pressure Pdm from the high-pressure-side pressure Pd in the refrigeration cycle circuit 10 is larger than a threshold value, it can be determined that the condition is State Pattern 3. Alternatively, when the value obtained by subtracting the target pressure Pdm from the high-pressure-side pressure Pd in the refrigeration cycle circuit 10 is larger than the threshold value and the compressor 11 operates at the maximum operating frequency, it can be determined that the condition is State Pattern 3. The threshold value is set to, for example, a value larger than the absolute value of a tolerance for the high-pressure-side pressure Pd that is allowable in the high-pressure constant control.

Figure 9:
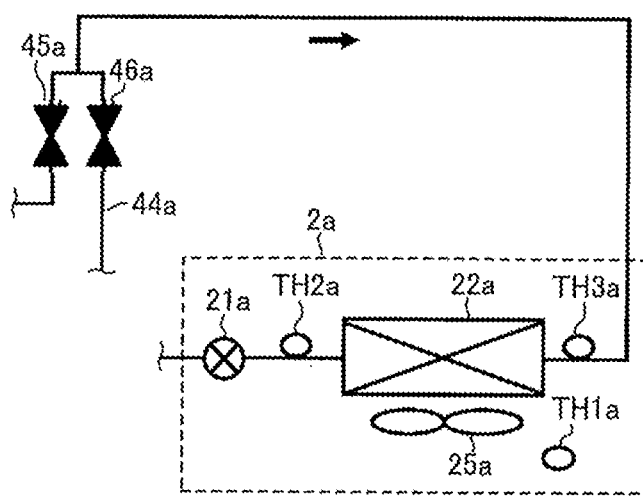
FIG. 9 is a diagram illustrating operations of the electronic expansion valve 21a, the low pressure valve 45a, and the high pressure valve 46a in State Pattern 4 in the refrigeration cycle apparatus according to Embodiment 1 of the present disclosure.

FIG. 9 is a diagram illustrating operations of the electronic expansion valve 21a, the low pressure valve 45a, and the high pressure valve 46a in State Pattern 4 in the refrigeration cycle apparatus according to Embodiment 1 of the present disclosure. As illustrated in FIGS. 2 and 9, State Pattern 4 is a condition where the high pressure valve 46a is locked in closed position. The high pressure valve 46a being locked in closed position is one of abnormalities at the high pressure valve 46a. Sticking of a valve body in the high pressure valve 46a causes the high pressure valve 46a to be locked in closed position. The high pressure valve 46a is opened in State Pattern 1, which is the normal condition, whereas the high pressure valve 46a is closed in State Pattern 4. If the high pressure valve 46a is locked in closed position during switching from the cooling operation to the heating operation in the indoor unit 2a, the high pressure valve 46a will fail to be opened. This results in State Pattern 4, rather than State Pattern 1.

Figure 10:
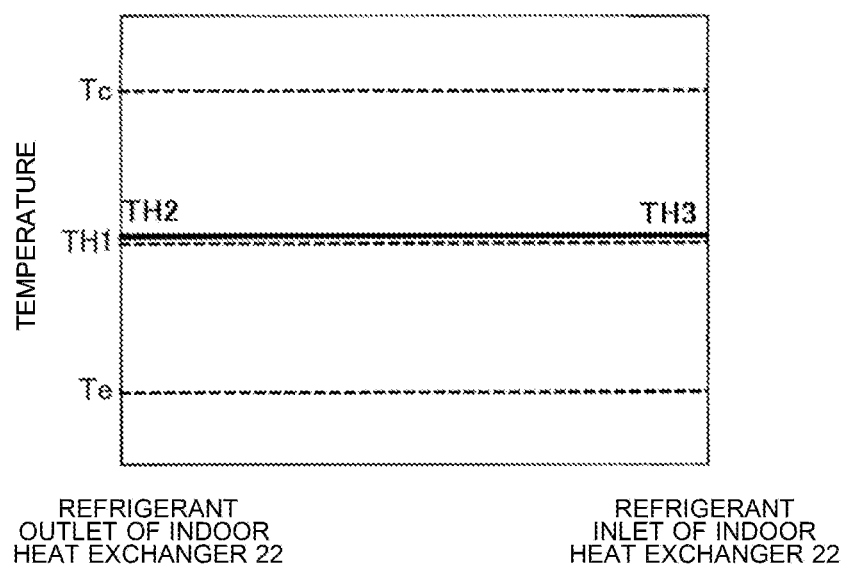
FIG. 10 is a diagram illustrating a graph showing a refrigerant temperature distribution in the indoor heat exchanger 22a in State Pattern 4 in the refrigeration cycle apparatus according to Embodiment 1 of the present disclosure.

FIG. 10 is a diagram illustrating a graph showing a refrigerant temperature distribution in the indoor heat exchanger 22a in State Pattern 4 in the refrigeration cycle apparatus according to Embodiment 1 of the present disclosure. The horizontal and vertical axes of FIG. 10 are the same as those of FIG. 4.

When the high pressure valve 46a is locked into closed position and the condition shifts to the State Pattern 4, the refrigerant is not provided to the indoor heat exchanger 22a, resulting in a superheated gas state in the indoor heat exchanger 22a. Thus, the liquid-portion temperature TH2 and the gas-portion temperature TH3 approach the room temperature TH1 (TH2=TH3=TH1).

State Pattern 2 and State Pattern 4 will be described together. In each of State Pattern 2 and State Pattern 4, the gas-portion temperature TH3 is smaller than the condensing temperature Tc (TH3<Tc), or alternatively, the liquid-portion temperature TH2 is equal to TH1.

Therefore, when the gas-portion temperature TH3 is lower than the condensing temperature Tc, or alternatively, when the liquid-portion temperature TH2 is equal to the room temperature TH1, it can be determined that the condition is State Pattern 2 or State Pattern 4.

In other words, when the gas-portion temperature TH3 is lower than the condensing temperature Tc, or alternatively, when the liquid-portion temperature TH2 is equal to TH1, it can be determined that an abnormality has occurred at either the electronic expansion valve 21a or the high pressure valve 46a. At this time, the notification unit 36 may provide notification of an abnormality at either the electronic expansion valve 21a or the high pressure valve 46a.

A change in gas-portion temperature TH3 lower than the condensing temperature Tc in State Pattern 2 differs from that in State Pattern 4. As illustrated in FIG. 6, the gas-portion temperature TH3 in State Pattern 2 decreases monotonically from a temperature higher than the condensing temperature Tc. When refrigerant at a portion associated with TH3 enters the two-phase state, the temperature of the refrigerant reaches a temperature equal to the condensing temperature Tc. After that, when the refrigerant at the portion associated with the gas-portion temperature TH3 enters the subcooled liquid state, the temperature of the refrigerant falls below the condensing temperature Tc and approaches the room temperature TH1 but differs from the room temperature TH1 by a constant temperature difference. Such a condition satisfies TH3−TH1>constant value, where the constant value is a reference value set on the basis of the temperature difference.

In contrast, as illustrated in FIG. 10, the gas-portion temperature TH3 in State Pattern 4 indicates that there is no flow of refrigerant, and is substantially equal to the room temperature TH1 (TH3=TH1). In other words, the temperature difference between the gas-portion temperature TH3 and the room temperature TH1 is higher than a constant value in State Pattern 2, whereas the temperature difference between the gas-portion temperature TH3 and the room temperature TH1 is less than or equal to the above-described constant value in State Pattern 4.

Therefore, if the temperature difference between the gas-portion temperature TH3 and the room temperature TH1 is higher than a second threshold temperature Tth02, which is predetermined as a constant value, (TH3−TH1>Tth02), it can be determined that the electronic expansion valve 21a is locked in closed position. If the temperature difference between the gas-portion temperature TH3 and the room temperature TH1 is less than or equal to the second threshold temperature Tth02 (TH3−TH1 Tth02), it can be determined that the high pressure valve 46a is locked in closed position.

An abnormality determination process, which is performed by the controller 3, for detection of an abnormality at least one of the low pressure valve 45a, the high pressure valve 46a, and the electronic expansion valve 21a will be described below. The controller 3 repeatedly performs at least one of abnormality determination processes illustrated in FIGS. 11 to 14 at preset time intervals. Herein, the controller 3 performs an abnormality determination process for detection of an abnormality at the low pressure valve 45a, the high pressure valve 46a, or the electronic expansion valve 21a. An abnormality determination process for detection of an abnormality at the low pressure valve 45b, the high pressure valve 46b, or the electronic expansion valve 21b can also be performed in a similar manner.

Figure 11:
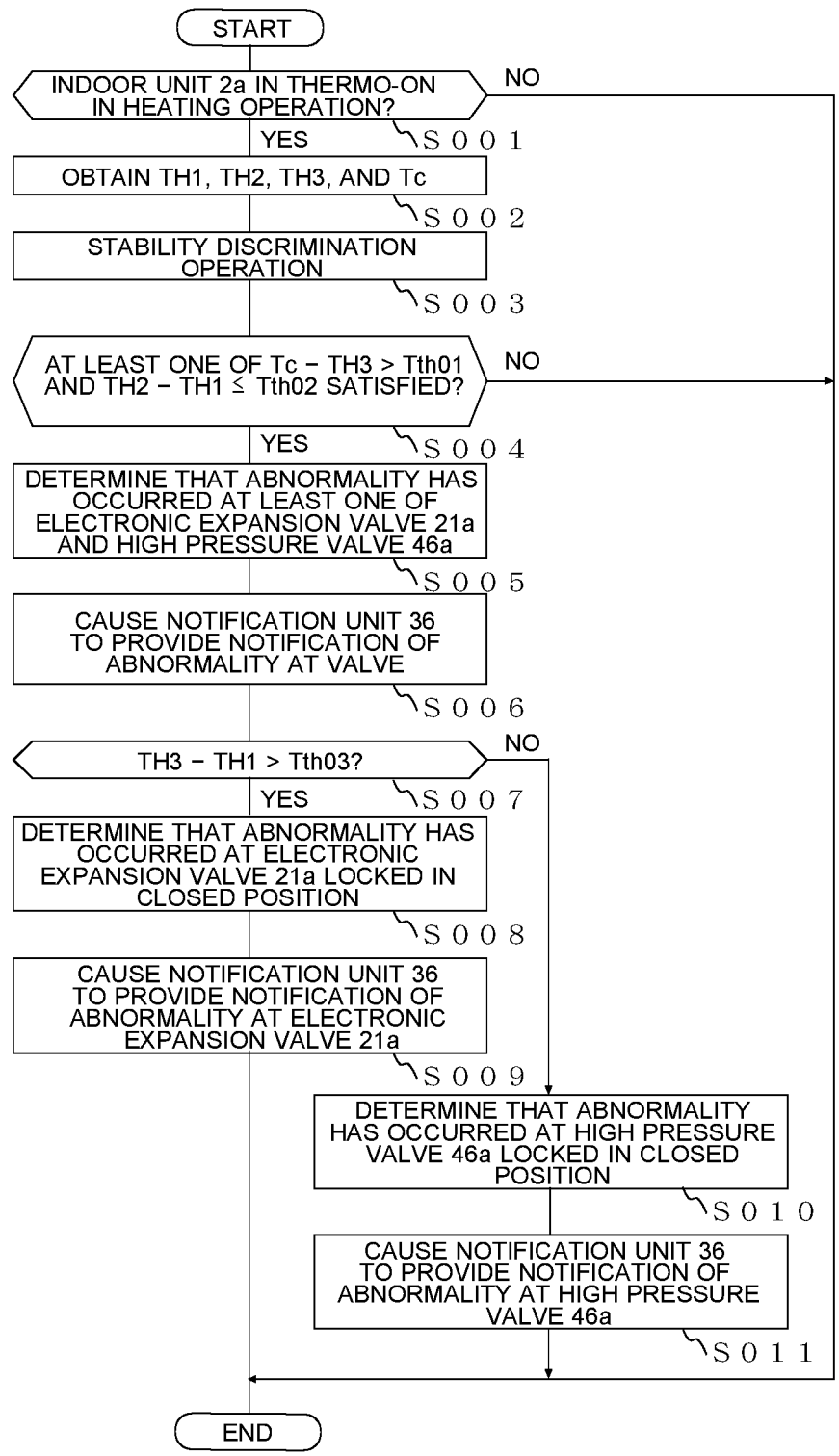
FIG. 11 is a diagram showing a flowchart illustrating a first abnormality detection process, which is performed by a controller 3 of the refrigeration cycle apparatus according to Embodiment 1 of the present disclosure.

FIG. 11 is a diagram showing a flowchart illustrating a first abnormality detection process, which is performed by the controller 3 of the refrigeration cycle apparatus according to Embodiment 1 of the present disclosure. In the first abnormality detection process, the controller 3 performs an abnormality determination process for detection of an abnormality at the high pressure valve 46a and the electronic expansion valve 21a. In the flowchart of FIG. 11, the controller 3 performs, as a single procedure, the abnormality determination process for the high pressure valve 46a and the electronic expansion valve 21a. An abnormality detection process for the high pressure valve 46a and an abnormality detection process for the electronic expansion valve 21a may be performed as different procedures.

In step S001, the controller 3 determines whether the indoor unit 2a is in the thermo-on state in the heating operation. This determination can be restated to a determination as to whether the refrigeration cycle apparatus is in an operation status in which the compressor 11 operates, the indoor heat exchanger 22a operates as a condenser, the low pressure valve 45a is closed, and the high pressure valve 46a is opened. If the indoor unit 2a is in the thermo-on state in the heating operation, the process proceeds to step S002; otherwise the first abnormality detection process is terminated.

In step S002, the controller 3 obtains data on the room temperature TH1, the liquid-portion temperature TH2, the gas-portion temperature TH3, and the condensing temperature Tc. The data on the room temperature TH1 is obtained on the basis of a measurement signal from the first temperature sensor TH1a. The data on the liquid-portion temperature TH2 is obtained on the basis of a measurement signal from the second temperature sensor TH2a. The data on the gas-portion temperature TH3 is obtained on the basis of a measurement signal from the third temperature sensor TH3a. The data on the condensing temperature Tc is obtained on the basis of a measurement signal from the high-pressure-side pressure sensor 15. The controller 3 obtains data on the evaporating temperature Te as necessary. The data on the evaporating temperature Te is obtained on the basis of a measurement signal from the low-pressure-side pressure sensor 16.

Then, in step S003, the controller 3 performs a stability discrimination operation. Specifically, the controller 3 obtains two or more temporally successive measurement values of any one or more of parameters that are the room temperature TH1, the liquid-portion temperature TH2, the gas-portion temperature TH3, and the condensing temperature Tc, which are measurement values. Then, the controller 3 calculates the difference between a mean value of the obtained measurement values and each of the measurement values, and determines whether each of the differences lies within a reference value range. A state in which each difference lines within the reference value range is a stable state. The controller 3 continues the abnormality determination process when determining that the stable state is held.

Then, the controller 3 performs an operation for a determination as to whether the gas-portion temperature TH3 is higher than the condensing temperature Tc and a determination as to whether the liquid-portion temperature TH2 is equal to the room temperature TH1. In step S004, the controller 3 determines whether a difference obtained by subtracting the gas-portion temperature TH3 from the condensing temperature Tc is higher than a first threshold temperature Tth01, and determines whether a difference obtained by subtracting the room temperature TH1 from the liquid-portion temperature TH2 is less than or equal to the second threshold temperature Tth02. When the controller 3 determines at least one of that the difference obtained by subtracting the gas-portion temperature TH3 from the condensing temperature Tc is higher than the first threshold temperature Tth01 and that the difference obtained by than or equal to the second threshold temperature Tth02, the process proceeds to step S005. When the controller 3 determines that the difference obtained by subtracting the gas-portion temperature TH3 from the condensing temperature Tc is not higher than the first threshold temperature Tth01 and the difference obtained by subtracting the room temperature TH1 from the liquid-portion temperature TH2 is not less than or equal to the second threshold temperature Tth02, the controller 3 terminates the first abnormality detection process. The reason why the first threshold temperature Tth01 and the second threshold temperature Tth02 are used is because a certain margin for setting is provided to avoid false detection. For example, sensors may have individual variations to some extent, and the difference between measurement values may have a margin of error. When the condensing temperature Tc is calculated, a saturation temperature obtained by converting a discharge pressure, which is a condensing pressure of the refrigerant, of the compressor 11 is used as the condensing temperature Tc. The condensing temperature Tc obtained by calculation may be lower than an actual condensing temperature Tc because a pressure loss occurs depending on an operation status. The above-described certain margin is determined in consideration of these factors.

In step S005, the controller 3 determines that an abnormality has occurred at either the electronic expansion valve 21a or the high pressure valve 46a. The reason is that when the gas-portion temperature TH3 is lower than the condensing temperature Tc or when the liquid-portion temperature TH2 is equal to the room temperature TH1, the condition corresponds to State Pattern 2 or State Pattern 4, rather than the above-described State Pattern 1, which is the normal condition.

Then, in step S006, the controller 3 performs an operation of causing the notification unit 36 to provide notification of the abnormality at the electronic expansion valve 21a or the high pressure valve 46a. For example, if operations in steps S007 to S011 are performed, the operations in steps S005 and S006 can be omitted. Furthermore, the controller 3 may terminate the process at step S006.

Then, in step S007, the controller 3 determines whether a temperature difference between the gas-portion temperature TH3 and the room temperature TH1 is higher than a third threshold temperature Tth03. When the controller 3 determines that the temperature difference between the gas-portion temperature TH3 and the room temperature TH1 is higher than the third threshold temperature Tth03, the process proceeds to step S008. When the controller 3 determines that the temperature difference between the gas-portion temperature TH3 and the room temperature TH1 is less than or equal to the third threshold temperature Tth03, the process proceeds to step S010. The determination operation in step S007 may be performed after a lapse of time after the determination in step S004 exceeds a preset threshold time, or after the gas-portion temperature TH3 stabilizes.

In step S008, the controller 3 determines that the abnormality has occurred at the electronic expansion valve 21a. The reason is that when the difference obtained by subtracting the room temperature TH1 from the gas-portion temperature TH3 is higher than the third threshold temperature Tth03, the condition corresponds to State Pattern 2.

Then, in step S009, the controller 3 performs an operation of causing the notification unit 36 to provide notification of the abnormality at the electronic expansion valve 21a. After that, the controller 3 terminates the first abnormality detection process.

In step S010, the controller 3 determines that the abnormality has occurred at the high pressure valve 46a. The reason is that when the value obtained by subtracting the room temperature TH1 from the gas-portion temperature TH3 is less than or equal to the third threshold temperature Tth03, the condition corresponds to State Pattern 4.

Then, in step S011, the controller 3 performs an operation of causing the notification unit 36 to provide notification of the abnormality at the high pressure valve 46a. After that, the controller 3 terminates the first abnormality detection process.

Figure 12:
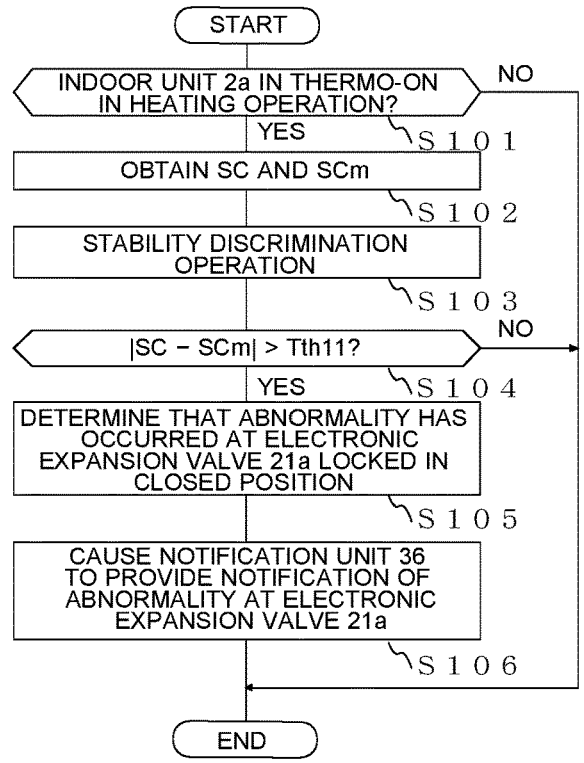
FIG. 12 is a diagram showing a flowchart illustrating a second abnormality detection process, which is performed by the controller 3 of the refrigeration cycle apparatus according to Embodiment 1 of the present disclosure.

FIG. 12 is a diagram showing a flowchart illustrating a second abnormality detection process, which is performed by the controller 3 of the refrigeration cycle apparatus according to Embodiment 1 of the present disclosure. The second abnormality detection process is performed to detect an abnormality at the electronic expansion valve 21a. The controller 3 may perform, as a single procedure, the first abnormality detection process described with reference to FIG. 11, the second abnormality detection process of FIG. 12, and at least one of third abnormality detection processes, which will be described later, illustrated in FIGS. 13 and 14.

In step S101, the controller 3 determines whether the indoor unit 2a is in the thermo-on state in the heating operation. This determination can be restated to a determination as to whether the refrigeration cycle apparatus is in the operation status in which the compressor 11 operates, the indoor heat exchanger 22a operates as a condenser, the low pressure valve 45a is closed, and the high pressure valve 46a is opened. When the controller 3 determines that the indoor unit 2a is in the thermo-on state in the heating operation, the process proceeds to step S102. When the controller 3 determines that the indoor unit 2a is not in the thermo-on state in the heating operation, the controller 3 terminates the second abnormality detection process.

In step S102, the controller 3 obtains data on the degree of subcooling SC in the indoor unit 2a and the target degree of subcooling SCm. The data on the degree of subcooling SC in the indoor unit 2a is calculated by, for example, subtracting data on the liquid-portion temperature TH2 from data on the condensing temperature Tc. The data on the condensing temperature Tc is obtained on the basis of a measurement signal from the high-pressure-side pressure sensor 15. The data on the liquid-portion temperature TH2 is obtained on the basis of a measurement signal from the second temperature sensor TH2a.

Then, in step S103, the controller 3 performs the stability discrimination operation. Specifically, the controller 3 obtains two or more temporally successive measurement values of any one or more of parameters that are the liquid-portion temperature TH2, which is a measurement value, the condensing temperature Tc, which is a measurement value, and the degree of subcooling SC, which is a calculated value, in the indoor unit 2. Then, the controller 3 calculates the difference between a mean value of the obtained measurement values and each of the measurement values, and determines whether each of the differences lies within a reference value range. A state in which each difference lies within the reference value range is a stable state. In the stable state, the controller 3 performs the abnormality determination process.

Then, in step S104, the controller 3 determines whether the difference between the degree of subcooling SC in the indoor unit 2a and the target degree of subcooling SCm is larger than a fourth threshold temperature Tth11. When the controller 3 determines that the absolute value of the difference between the degree of subcooling SC in the indoor unit 2a and the target degree of subcooling SCm is larger than the fourth threshold temperature Tth11, the process proceeds to step S105. When the controller 3 determines that the absolute value of the difference between the degree of subcooling SC in the indoor unit 2a and the target degree of subcooling SCm is not larger than the fourth threshold temperature Tth11, the controller 3 terminates the second abnormality detection process. The reason why the fourth threshold temperature Tth11 is used is because a certain margin for setting is provided to avoid false detection. For example, sensors may have individual variations to some extent, and the difference between measurement values may have a margin of error. When the condensing temperature Tc is calculated, a saturation temperature obtained by converting a discharge pressure, which is a condensing pressure of the refrigerant, of the compressor 11 is used as the condensing temperature Tc. The condensing temperature Tc obtained by calculation may be lower than an actual condensing temperature Tc because a pressure loss occurs depending on an operation status. The above-described certain margin is determined in consideration of these factors.

In step S105, the controller 3 determines that an abnormality has occurred at the electronic expansion valve 21a. In State Pattern 1, which is the normal condition, the opening degree of the electronic expansion valve 21a is adjusted such that the degree of subcooling SC in the indoor unit 2a is close to the target degree of subcooling SCm. A condition where the degree of subcooling SC in the indoor unit 2a is not close to the target degree of subcooling SCm corresponds to State Pattern 2 or State Pattern 4, rather than State Pattern 1, which is the normal condition. Therefore, the controller 3 is configured to determine that an abnormality has occurred at the electronic expansion valve 21a.

Then, in step S106, the controller 3 performs an operation of causing the notification unit 36 to provide notification of the abnormality at the electronic expansion valve 21a. After that, the controller 3 terminates the second abnormality detection process.

Figure 13:
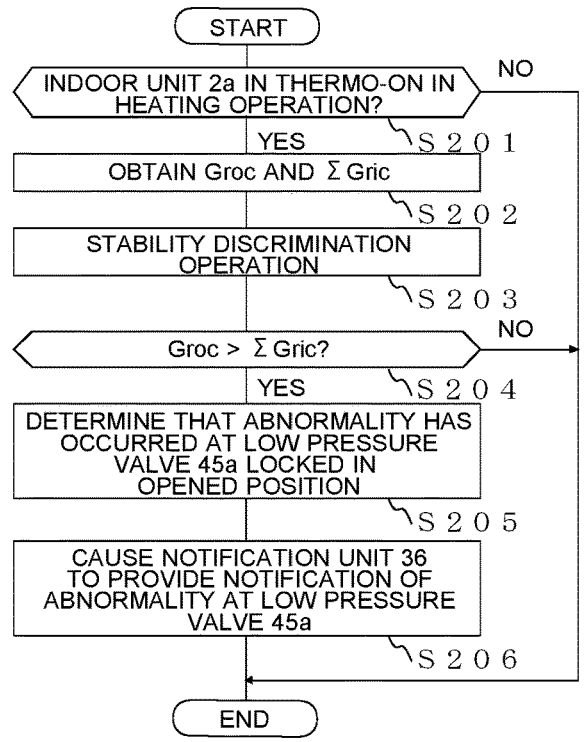
FIG. 13 is a diagram showing a flowchart illustrating a third abnormality detection process, which is performed by the controller 3 of the refrigeration cycle apparatus according to Embodiment 1 of the present disclosure.

FIG. 13 is a diagram showing a flowchart illustrating a third abnormality detection process, which is performed by the controller 3 of the refrigeration cycle apparatus according to Embodiment 1 of the present disclosure.

In step S201, the controller 3 determines whether the indoor unit 2a is in the thermo-on state in the heating operation. This determination can be restated to a determination as to whether the refrigeration cycle apparatus is in the operation status in which the compressor 11 operates, the indoor heat exchanger 22a operates as a condenser, the low pressure valve 45a is closed, and the high pressure valve 46a is opened. When the controller 3 determines that the indoor unit 2a is in the thermo-on state in the heating operation, the process proceeds to step S202. When the controller 3 determines that the indoor unit 2a is not in the thermo-on state in the heating operation, the controller 3 terminates the third abnormality detection process.

Then, in step S202, the controller 3 obtains data on the refrigerant flow rate Groc through the compressor 11 and data on the sum ΣGric of the refrigerant flow rates through the electronic expansion valves 21a and 21b. The data on the refrigerant flow rate Groc in the outdoor unit 1 is obtained on the basis of, for example, the Equation (1) described above. The data on the sum ΣGric of the refrigerant flow rates in the indoor units 2a and 2b is obtained on the basis of, for example, the Equation (2) described above.

Then, in step S203, the controller 3 performs the stability discrimination operation. The controller 3 obtains two or more temporally successive measurement values of any one or more of parameters that are the operating frequency, which is a measurement value, of the compressor 11, the liquid-portion temperature TH2, which is a measurement value, the condensing temperature Tc, which is a measurement value, the refrigerant flow rate Groc, which is a calculated value, in the outdoor unit 1, and the sum ΣGric, which is a calculated value, of the refrigerant flow rates in the indoor units 2a and 2b. The controller 3 calculates the difference between a mean value of the obtained measurement values and each of the measurement values. A state in which each of the differences lies within a reference value range is determined as a stable state. In Embodiment 1, the controller 3 performs the abnormality determination process when determining that the stable state is held.

Then, in step S204, the controller 3 determines whether the refrigerant flow rate Groc in the outdoor unit 1 is larger than the sum ΣGric of the refrigerant flow rates in the indoor units 2a and 2b. When the controller 3 determines that the refrigerant flow rate Groc is larger than the sum ΣGric of the refrigerant flow rates, the process proceeds to step S205. When the controller 3 determines that the refrigerant flow rate Groc is equal to the sum ΣGric of the refrigerant flow rates, the controller 3 terminates the third abnormality detection process.

In step S205, the controller 3 determines that an abnormality has occurred at the low pressure valve 45a. The reason is that when the refrigerant flow rate Groc in the outdoor unit 1 is larger than the sum ΣGric of the refrigerant flow rates in the indoor units 2a and 2b, the condition corresponds to State Pattern 3.

Then, in step S206, the controller 3 performs an operation of causing the notification unit 36 to provide notification of the abnormality at the low pressure valve 45a. After that, the controller 3 terminates the third abnormality detection process.

Figure 14:
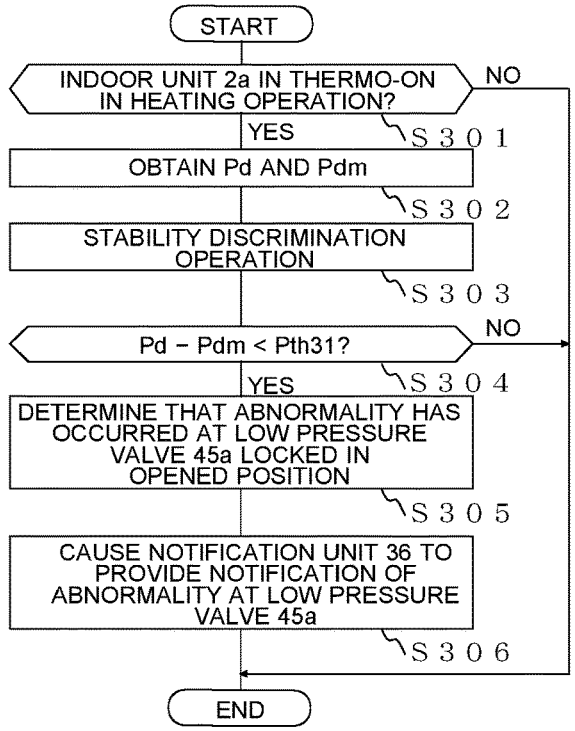
FIG. 14 is a diagram showing a flowchart illustrating another third abnormality detection process, which is performed by the controller 3 of the refrigeration cycle apparatus according to Embodiment 1 of the present disclosure.
Figure 15:
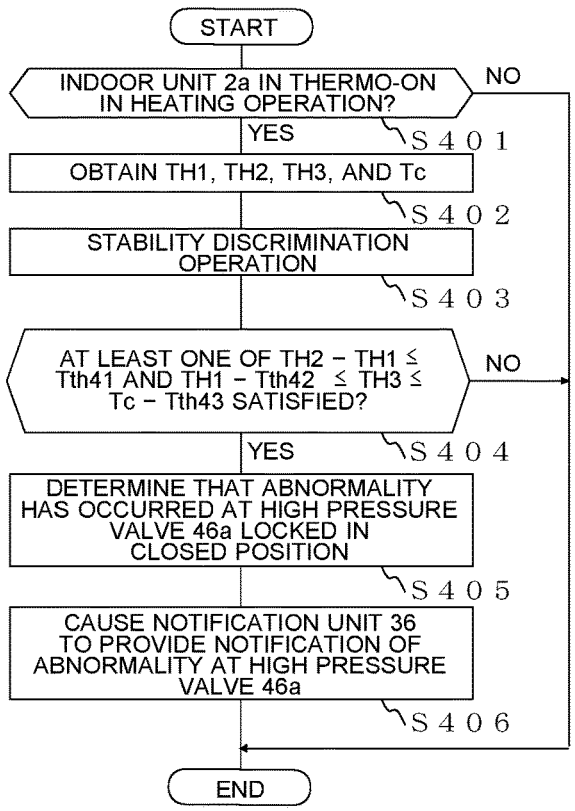
FIG. 15 is a diagram showing a flowchart illustrating a fourth abnormality detection process, which is performed by the controller 3 of the refrigeration cycle apparatus according to Embodiment 1 of the present disclosure.

FIG. 14 is a diagram showing a flowchart illustrating another third abnormality detection process, which is performed by the controller 3 of the refrigeration cycle apparatus according to Embodiment 1 of the present disclosure.

In step S301, the controller 3 determines whether the indoor unit 2a is in the thermo-on state in the heating operation. This determination can be restated to a determination as to whether the refrigeration cycle apparatus is in the operation status in which the compressor 11 operates, the indoor heat exchanger 22a operates as a condenser, the low pressure valve 45a is closed, and the high pressure valve 46a is opened. When the controller 3 determines that the indoor unit 2a is in the thermo-on state in the heating operation, the process proceeds to step S302. When the controller 3 determines that the indoor unit 2a is not in the thermo-on state in the heating operation, the controller 3 terminates the third abnormality detection process.

In step S302, the controller 3 obtains data on the high-pressure-side pressure Pd and the target pressure Pdm. The data on the high-pressure-side pressure Pd is obtained on the basis of a measurement signal from the high-pressure-side pressure sensor 15. The data on the target pressure Pdm is stored in the storage unit 31 in advance.

Then, in step S303, the controller 3 performs a stability discrimination operation. For example, the controller 3 obtains two or more temporally successive measurement values of any one or more of parameters that are the high-pressure-side pressure Pd, which is a measurement value, and the operating frequency, which is a measurement value, of the compressor 11. The controller 3 calculates the difference between a mean value of the obtained measurement values and each of the measurement values, and determines whether each of the differences lies within a reference value range. A state in which each difference lies within the reference value range is a stable state. In the stable state, the controller 3 performs the abnormality determination process.

Then, in step S304, the controller 3 determines whether a value Pd−Pdm, which is obtained by subtracting the target pressure Pdm from the high-pressure-side pressure Pd, is greater than a predetermined threshold pressure Pth31. When the controller 3 determines that the value obtained by subtracting the target pressure Pdm from the high-pressure-side pressure Pd is greater than the threshold pressure Pth31, the process proceeds to step S305. When the controller 3 determines that the value is smaller than or equal to the threshold pressure Pth31, the controller 3 terminates the third abnormality detection process.

In step S305, the controller 3 determines that an abnormality has occurred at the low pressure valve 45a. The reason is that when the value obtained by subtracting the target pressure Pdm from the high-pressure-side pressure Pd is smaller than the threshold pressure Pth31, the condition corresponds to State Pattern 3.

Then, in step S306, the controller 3 performs an operation of causing the notification unit 36 to provide notification of the abnormality at the low pressure valve 45a. After that, the controller 3 terminates the third abnormality detection process.

In the above-described step S304, the controller 3 may determine whether the value obtained by subtracting the target pressure Pdm from the high-pressure-side pressure Pd is larger than the threshold pressure Pth31 and the compressor 11 operates at the maximum operating frequency. When the controller 3 determines that the value obtained by subtracting the target pressure Pdm from the high-pressure-side pressure Pd is larger than the threshold pressure Pth31 and the compressor 11 operates at the maximum operating frequency, the process proceeds to step S305. When the controller 3 determines that the value obtained by subtracting the target pressure Pdm from the high-pressure-side pressure Pth31 or determines that the compressor 11 operates at an operating frequency below the maximum operating frequency, the controller 3 terminates the third abnormality detection process.

FIG. 1 is a diagram showing a flowchart illustrating a fourth abnormality detection process, which is performed by the controller 3 of the refrigeration cycle apparatus according to Embodiment 1 of the present disclosure.

In step S401, the controller 3 determines whether the indoor unit 2a is in the thermo-on state in the heating operation. This determination can be restated to a determination as to whether the refrigeration cycle apparatus is in the operation status in which the compressor 11 operates, the indoor heat exchanger 22a operates as a condenser, the low pressure valve 45a is closed, and the high pressure valve 46a is opened. When the controller 3 determines that the indoor unit 2a is in the thermo-on state in the heating operation, the process proceeds to step S402. When the controller 3 determines that the indoor unit 2a is not in the thermo-on state in the heating operation, the controller 3 terminates the fourth abnormality detection process.

In step S402, the controller 3 obtains data on the room temperature TH1, the liquid-portion temperature TH2, the gas-portion temperature TH3, and the condensing temperature Tc. The data on the room temperature TH1 is obtained on the basis of a measurement signal from the first temperature sensor TH1a. The data on the liquid-portion temperature TH2 is obtained on the basis of a measurement signal from the second temperature sensor TH2a. The data on the gas-portion temperature TH3 is obtained on the basis of a measurement signal from the third temperature sensor TH3a. The data on the condensing temperature Tc is obtained on the basis of a measurement signal from the high-pressure-side pressure sensor 15.

Then, in step S403, the controller 3 performs a stability discrimination operation. Specifically, the controller 3 obtains two or more temporally successive measurement values of any one or more of parameters that are the room temperature TH1, the liquid-portion temperature TH2, the gas-portion temperature TH3, and the condensing temperature Tc, which are measurement values. The controller 3 calculates the difference between a mean value of the obtained measurement values and each of the measurement values, and determines whether each of the differences lies within a reference value range. A state in which each difference lies within the reference value range is a stable state. In the stable state, the controller 3 performs the abnormality determination process.

Then, in step S404, the controller 3 determines whether the gas-portion temperature TH3 is between the condensing temperature Tc and the room temperature TH1 and determines whether the liquid-portion temperature TH2 is equal to the room temperature TH1. Specifically, When the controller 3 determines at least one of that the gas-portion temperature TH3 is greater than or equal to a value obtained by subtracting a sixth threshold temperature Tth42 from the room temperature TH1 and is less than or equal to a value obtained by subtracting a seventh threshold temperature Tth43 from the condensing temperature Tc and that a temperature difference obtained by subtracting the room temperature TH1 from the liquid-portion temperature TH2 is less than or equal to a fifth threshold temperature Tth41, the process proceeds to step S405. Otherwise, the controller 3 terminates the fourth abnormality detection process. The reason why the fifth threshold temperature Tth41, the sixth threshold temperature Tth42, and the seventh threshold temperature Tth43 are used is because a certain margin for setting is provided to avoid false detection. For example, sensors may have individual variations to some extent, and the difference between measurement values may have a margin of error. When the condensing temperature Tc is calculated, a saturation temperature obtained by converting a discharge pressure, which is a condensing pressure of the refrigerant, of the compressor 11 is used as the condensing temperature Tc. The condensing temperature Tc obtained by calculation may be lower than an actual condensing temperature Tc because a pressure loss occurs depending on an operation status. The above-described certain margin is determined in consideration of these factors.

In step S405, the controller 3 determines that an abnormality has occurred at the high pressure valve 46a. The reason is that when the gas-portion temperature TH3 is higher than the room temperature TH1 and is lower than the condensing temperature Tc or when the liquid-portion temperature TH2 is equal to the room temperature TH1, the condition corresponds to State Pattern 4, rather than State Pattern 1, which is the normal condition.

Then, in step S406, the controller 3 performs an operation of causing the notification unit 36 to provide notification of the abnormality at the electronic expansion valve 21a or the high pressure valve 46a. After that, the controller 3 terminates the fourth abnormality detection process.

As described above, the refrigeration cycle apparatus according to Embodiment 1 includes the refrigeration cycle circuit 10, the bypass passage 44, the low pressure valve 45a, the high pressure valve 46a, the first temperature sensor TH1a, the second temperature sensor TH2a, and the notification unit 36. The refrigeration cycle circuit 10 includes the compressor 11, the refrigerant flow switching device 14, the outdoor heat exchanger 12, the electronic expansion valve 21a, and the indoor heat exchanger 22a. In the refrigeration cycle circuit 10, the bypass passage 44 connects the first junction portion 41 provided between the outdoor heat exchanger 12 and the electronic expansion valve 21a to the second junction portion 42a provided between the indoor heat exchanger 22a and the refrigerant flow switching device 14. The low pressure valve 45a is provided between the second junction portion 42a and the refrigerant flow switching device 14 in the refrigeration cycle circuit 10. In addition, the high pressure valve 46a is provided to the bypass passage 44. The first temperature sensor TH1a is configured to measure the room temperature TH1, which is a temperature in a room to which air passing through the indoor heat exchanger 22a is provided. The second temperature sensor TH2a is configured to measure the liquid-portion temperature TH2, which is a temperature of refrigerant at a liquid portion of the indoor heat exchanger 22a. The third temperature sensor TH3a is configured to measure the gas-portion temperature TH3, which is a temperature of refrigerant at a gas portion of the indoor heat exchanger 22a. The notification unit 36 is configured to provide notification of an abnormality. The refrigeration cycle apparatus performs an operation in the operation status in which the indoor unit 2a is in the thermo-on state in the heating operation, or in which the compressor 11 operates, the indoor heat exchanger 22a operates as a condenser, the low pressure valve 45a is closed, and the high pressure valve 46a is opened. In this operation status, when the controller 3 determines that a temperature obtained by subtracting the gas-portion temperature TH3, which is a temperature measured by the third temperature sensor TH3a, from a saturation conversion temperature, which is a saturation temperature obtained by converting a condensing pressure of the refrigerant, is larger than the first threshold temperature Tth01 or determines that a value obtained by subtracting a temperature measured by the first temperature sensor TH1a from a temperature measured by the second temperature sensor TH2a is smaller than a threshold, the notification unit 36 provides notification of an abnormality at the electronic expansion valve 21a or the high pressure valve 46a. The high pressure valve 46a is an example of a second valve. The low pressure valve 45a is an example of a first valve. The electronic expansion valve 21a is an example of an expansion device.

The above-described configuration of the refrigeration cycle apparatus according to Embodiment 1 enables more accurate and earlier detection of an abnormality at the electronic expansion valve 21a or the high pressure valve 46a. As the refrigeration cycle apparatus according to Embodiment 1 is configured to provide earlier notification of an abnormality at the electronic expansion valve 21a or the high pressure valve 46a, the electronic expansion valve 21a or the high pressure valve 46a is allowed to be returned to a normal state earlier. Therefore, the refrigeration cycle apparatus according to Embodiment 1 is configured to reduce a duration in which the indoor unit 2a is in poor condition.

In the refrigeration cycle apparatus according to Embodiment 1, when a value obtained by subtracting the temperature measured by the first temperature sensor TH1a from the temperature measured by the third temperature sensor TH3a is larger than the third threshold temperature Tth03 in the above-described operation status, the notification unit 36 is configured to provide notification of an abnormality at the electronic expansion valve 21a.

As illustrated in FIG. 6, an abnormality at the electronic expansion valve 21a in the above-described operation status causes the gas-portion temperature TH3 measured by the third temperature sensor TH3a to decrease. If the indoor heat exchanger 22a is filled with liquid refrigerant, the gas-portion temperature TH3 will fall to a temperature below the condensing temperature Tc. However, as high pressure gas refrigerant is provided from the compressor 11 to the indoor heat exchanger 22a at all times, a constant temperature difference between the gas-portion temperature TH3 and the room temperature TH1 is allowed to be kept even in a condition where liquid accumulates in an evaporator. Therefore, the difference between TH3 and TH1 is greater than or equal to a constant value. Therefore, the above-described configuration enables more accurate detection of an abnormality at the electronic expansion valve 21a.

In the refrigeration cycle apparatus according to Embodiment 1, when the value obtained by subtracting the temperature measured by the first temperature sensor TH1a from the temperature measured by the third temperature sensor TH3a is less than or equal to the third threshold temperature in the above-described operation status, the notification unit 36 provides notification of an abnormality at the high pressure valve 46a.

As illustrated in FIG. 10, an abnormality at the high pressure valve 46a in the above-described operation status causes the gas-portion temperature TH3 measured by the third temperature sensor TH3a to fall to a temperature lower than the condensing temperature Tc, because the refrigerant is not provided into the indoor heat exchanger 22a. Furthermore, the refrigerant in the indoor heat exchanger 22a turns into superheated gas, so that the gas-portion temperature TH3 is equal to the room temperature TH1 measured by the first temperature sensor TH1a. Therefore, the refrigeration cycle apparatus according to Embodiment 1 is configured to detect an abnormality at the high pressure valve 46a more accurately. In addition, as the refrigeration cycle apparatus according to Embodiment 1 is configured to provide notification of an abnormality at the high pressure valve 46a earlier, the high pressure valve 46a is allowed to be returned to the normal state earlier. Therefore, the refrigeration cycle apparatus according to Embodiment 1 is configured to reduce a duration in which the indoor unit 2a is in poor condition.

In the refrigeration cycle apparatus according to Embodiment 1, when the refrigerant flow rate through the compressor 11 is greater than the refrigerant flow rate through the electronic expansion valve 21a in the above-described operation status, the notification unit 36 provides notification of an abnormality at the low pressure valve 45a.

An abnormality at the low pressure valve 45a in the above-described operation status causes part of high pressure refrigerant to pass through the bypass passage 44 and enter the low-pressure side of the refrigeration cycle circuit 10. Thus, the refrigerant flow rate through the compressor 11 is greater than the refrigerant flow rate through the electronic expansion valve 21a. Therefore, the refrigeration cycle apparatus according to Embodiment 1 is configured to detect an abnormality at the low pressure valve 45a more accurately.

In the refrigeration cycle apparatus according to Embodiment 1, the compressor 11 is controlled such that the high-pressure-side pressure Pd in the refrigeration cycle circuit 10 approaches the target pressure Pdm. When a value obtained by subtracting the target pressure Pdm from the high-pressure-side pressure Pd is larger than the threshold pressure Pth31 in the above-described operation status, the notification unit 36 provides notification of an abnormality at the low pressure valve 45a.

An abnormality at the low pressure valve 45a in the above-described operation status causes part of high pressure refrigerant to pass through the bypass passage 44 and enter the low-pressure side of the refrigeration cycle circuit 10, causing a reduction in high-pressure-side pressure Pd. Thus, the high-pressure-side pressure Pd decreases away from the target pressure Pdm. Therefore, the refrigeration cycle apparatus according to Embodiment 1 is configured to detect an abnormality at the low pressure valve 45a more accurately. In addition, as the refrigeration cycle apparatus according to Embodiment 1 is configured to provide notification of an abnormality at the low pressure valve 45a earlier, the low pressure valve 45a is allowed to be returned to a normal state earlier. Therefore, the above-described configuration reduces a duration in which the operation efficiency of the refrigeration cycle apparatus decreases.

In the refrigeration cycle apparatus according to Embodiment 1, the compressor 11 is controlled such that the high-pressure-side pressure Pd in the refrigeration cycle circuit 10 approaches the target pressure Pdm. Therefore, when a value obtained by subtracting the target pressure Pdm from the high-pressure-side pressure Pd is larger than the threshold pressure Pth31 and the compressor 11 operates at the maximum operating frequency in the above-described operation status, the notification unit 36 provides notification of an abnormality at the low pressure valve 45a.

After an abnormality at the low pressure valve 45a in the above-described operation status causes an increase in refrigerant flow rate through the bypass passage 44, the high-pressure-side pressure Pd cannot be maintained at the target pressure Pdm even if the operating frequency of the compressor 11 is increased up to the maximum operating frequency. Therefore, the refrigeration cycle apparatus according to Embodiment 1 is configured to detect an abnormality at the low pressure valve 45a more accurately.

The refrigeration cycle apparatus according to Embodiment 1 further includes the operation mode switching unit 37 used to switch between the operation modes of the refrigeration cycle apparatus. The operation mode switching unit 37 is switchable at least to an operation mode in which operation is performed in the above-described operation status. The refrigeration cycle apparatus according to Embodiment 1 is configured to detect an abnormality at the low pressure valve 45a, the high pressure valve 46a, or the electronic expansion valve 21a even while the indoor unit 2a is performing the heating operation.

Embodiment 2

In the above-described refrigeration cycle apparatus according to Embodiment 1, the controller 3 performs abnormality detection for each of the low pressure valves 45a and 45b, which correspond to first valves, the high pressure valves 46a and 46b, which correspond to second valves, and the electronic expansion valves 21a and 21b. The detection may be performed in any other manner. The controller 3 may perform abnormality detection for a predetermined or selected valve.

The invention claimed is:

1. A refrigeration cycle apparatus, comprising:
a refrigeration cycle circuit connecting a compressor, a refrigerant flow switching device valve, an outdoor heat exchanger, an expansion valve, and an indoor heat exchanger, the refrigeration cycle circuit being configured to circulate refrigerant;
a first junction portion provided between the outdoor heat exchanger and the expansion valve, the first junction portion being configured to divide the refrigerant;
a second junction portion provided between the indoor heat exchanger and the refrigerant flow switching valve, the second junction portion being configured to divide the refrigerant;
a bypass pipe connecting the first junction portion and the second junction portion, the bypass pipe being configured to cause the refrigerant to flow through the bypass pipe;
a first valve provided between the second junction portion and the refrigerant flow switching valve;
a second valve provided to the bypass pipe;
a first temperature sensor configured to measure a temperature in a room to which air passing through the indoor heat exchanger is provided;
a second temperature sensor configured to measure a temperature of refrigerant at a liquid portion of the indoor heat exchanger; and
a third temperature sensor configured to measure a temperature of refrigerant at a gas portion of the indoor heat exchanger,
in an operation status in which the compressor operates, the indoor heat exchanger operates as a condenser, the first valve is closed, and the second valve is opened,
when a temperature obtained by subtracting a temperature measured by the third temperature sensor from a saturation temperature obtained by converting a condensing pressure of the refrigerant is larger than a first threshold temperature that is predetermined,
or when a temperature obtained by subtracting a temperature measured by the first temperature sensor from a temperature measured by the second temperature sensor is smaller than a second threshold temperature,
the refrigeration cycle apparatus being configured to detect an abnormality at at least one of the expansion valve and the second valve, wherein
when a value obtained by subtracting the temperature measured by the first temperature sensor from the temperature measured by the third temperature sensor is less than or equal to a third threshold temperature in the operation status, the refrigeration cycle apparatus is configured to detect an abnormality at the second valve.

2. The refrigeration cycle apparatus of claim 1, wherein when the value obtained by subtracting the temperature measured by the first temperature sensor from the temperature measured by the third temperature sensor is larger than the third threshold temperature in the operation status, the refrigeration cycle apparatus is configured to detect an abnormality at the expansion valve.

3. The refrigeration cycle apparatus of claim 1, wherein when a refrigerant flow rate through the compressor is greater than a refrigerant flow rate through the expansion valve in the operation status, the refrigeration cycle apparatus is configured to detect an abnormality at the first valve.

4. The refrigeration cycle apparatus of claim 1,
wherein the compressor is controlled such that a pressure of the refrigerant on a high-pressure side of the refrigeration cycle circuit approaches a target pressure, and
wherein when a value obtained by subtracting the target pressure from the pressure of the refrigerant on the high-pressure side is larger than a threshold pressure in the operation status, the refrigeration cycle apparatus is configured to detect an abnormality at the first valve.

5. The refrigeration cycle apparatus of claim 1,
wherein the compressor is controlled such that a pressure of the refrigerant on a high-pressure side of the refrigeration cycle circuit approaches a target pressure, and
wherein when a value obtained by subtracting the target pressure from the pressure of the refrigerant on the high-pressure side is larger than a threshold pressure and the compressor operates at a maximum operating frequency in the operation status, the refrigeration cycle apparatus is configured to detect an abnormality at the first valve.

6. The refrigeration cycle apparatus of claim 1,
wherein the expansion valve is controlled such that a degree of subcooling in the indoor heat exchanger operating as a condenser in the refrigeration cycle circuit approaches a target degree of subcooling, and
wherein when a difference between the degree of subcooling and the target degree of subcooling is larger than a fourth threshold temperature in the operation status, the refrigeration cycle apparatus is configured to detect an abnormality at the expansion valve.

7. The refrigeration cycle apparatus of claim 1,
wherein the refrigeration cycle apparatus is configured to calculate a difference between a mean value of two or more temporally successive measurement values of any one or more of parameters and each of the measurement values, the parameters being a condensing temperature, a degree of subcooling in each of the indoor units, a temperature measured by the first temperature sensor, and a temperature measured by the second temperature sensor, and
wherein when the calculated difference lies within a predetermined reference value range, the refrigeration cycle apparatus is configured to perform abnormality detection for a valve at least one of the expansion valve and the second valve.

8. The refrigeration cycle apparatus of claim 1, further comprising
at least one of a display and an audio output configured to provide notification of an abnormality at the valve.

9. The refrigeration cycle apparatus of claim 1, wherein the refrigerant flow switching valve is switchable at least to an operation mode in which operation is performed in the operation status.

10. A refrigeration cycle apparatus, comprising:
a refrigeration cycle circuit connecting a compressor, a refrigerant flow switching valve, an outdoor heat exchanger, an expansion valve, and an indoor heat exchanger, the refrigeration cycle circuit being configured to circulate refrigerant;
a first junction portion provided between the outdoor heat exchanger and the expansion valve, the first junction portion being configured to divide the refrigerant;
a second junction portion provided between the indoor heat exchanger and the refrigerant flow switching valve, the second junction portion being configured to divide the refrigerant;
a bypass pipe connecting the first junction portion and the second junction portion, the bypass pipe being configured to cause the refrigerant to flow through the bypass pipe;
a first valve provided between the second junction portion and the refrigerant flow switching valve;
a second valve provided to the bypass pipe;
a first temperature sensor configured to measure a temperature in a room to which air passing through the indoor heat exchanger is provided;
a second temperature sensor configured to measure a temperature of refrigerant at a liquid portion of the indoor heat exchanger; and
a third temperature sensor configured to measure a temperature of refrigerant at a gas portion of the indoor heat exchanger,
in an operation status in which the compressor operates, the indoor heat exchanger operates as a condenser, the first valve is closed, and the second valve is opened, the refrigeration cycle apparatus being configured to perform abnormality detection for the expansion valve, the first valve, and the second valve by using temperatures measured by the first temperature sensor, the second temperature sensor, and the third temperature sensor and a pressure of the refrigerant on a high-pressure side of the refrigeration cycle circuit, wherein
when a value obtained by subtracting the temperature measured by the first temperature sensor from the temperature measured by the third temperature sensor is less than or equal to a threshold temperature in the operation status, the refrigeration cycle apparatus is configured to detect an abnormality at the second valve.

11. A refrigeration cycle apparatus, comprising:
a refrigeration cycle circuit connecting a compressor, a refrigerant flow switching valve, an outdoor heat exchanger, an expansion valve, and an indoor heat exchanger, the refrigeration cycle circuit being configured to circulate refrigerant;
a first junction portion provided between the outdoor heat exchanger and the expansion valve, the first junction portion being configured to divide the refrigerant;
a second junction portion provided between the indoor heat exchanger and the refrigerant flow switching valve, the second junction portion being configured to divide the refrigerant;
a bypass pipe connecting the first junction portion and the second junction portion, the bypass pipe being configured to cause the refrigerant to flow through the bypass pipe;
a first valve provided between the second junction portion and the refrigerant flow switching valve;
a second valve provided to the bypass pipe;
a first temperature sensor configured to measure a temperature in a room to which air passing through the indoor heat exchanger is provided;
a second temperature sensor configured to measure a temperature of refrigerant at a liquid portion of the indoor heat exchanger; and
a third temperature sensor configured to measure a temperature of refrigerant at a gas portion of the indoor heat exchanger,
in an operation status in which the compressor operates, the indoor heat exchanger operates as a condenser, the first valve is closed, and the second valve is opened,
when a temperature obtained by subtracting a temperature measured by the third temperature sensor from a saturation temperature obtained by converting a condensing pressure of the refrigerant is larger than a first threshold temperature that is predetermined,
or when a temperature obtained by subtracting a temperature measured by the first temperature sensor from a temperature measured by the second temperature sensor is smaller than a second threshold temperature,
the refrigeration cycle apparatus being configured to detect an abnormality at at least one of the expansion valve and the second valve, wherein when the temperature measured by the second temperature sensor is equal to the temperature measured by the first temperature sensor in the operation status or when the temperature measured by the third temperature sensor is lower than a condensing temperature in the operation status, the refrigeration cycle apparatus is configured to detect an abnormality at the second valve.

12. The refrigeration cycle apparatus of claim 11, wherein when a value obtained by subtracting the temperature measured by the first temperature sensor from the temperature measured by the third temperature sensor is larger than a third threshold temperature in the operation status, the refrigeration cycle apparatus is configured to detect an abnormality at the expansion valve.

13. The refrigeration cycle apparatus of claim 11, wherein when a refrigerant flow rate through the compressor is greater than a refrigerant flow rate through the expansion valve in the operation status, the refrigeration cycle apparatus is configured to detect an abnormality at the first valve.

14. The refrigeration cycle apparatus of claim 11,
wherein the compressor is controlled such that a pressure of the refrigerant on a high-pressure side of the refrigeration cycle circuit approaches a target pressure, and
wherein when a value obtained by subtracting the target pressure from the pressure of the refrigerant on the high-pressure side is larger than a threshold pressure in the operation status, the refrigeration cycle apparatus is configured to detect an abnormality at the first valve.

15. The refrigeration cycle apparatus of claim 11,
wherein the compressor is controlled such that a pressure of the refrigerant on a high-pressure side of the refrigeration cycle circuit approaches a target pressure, and
wherein when a value obtained by subtracting the target pressure from the pressure of the refrigerant on the high-pressure side is larger than a threshold pressure and the compressor operates at a maximum operating frequency in the operation status, the refrigeration cycle apparatus is configured to detect an abnormality at the first valve.

16. The refrigeration cycle apparatus of claim 11,
wherein the expansion valve is controlled such that a degree of subcooling in the indoor heat exchanger operating as a condenser in the refrigeration cycle circuit approaches a target degree of subcooling, and
wherein when a difference between the degree of subcooling and the target degree of subcooling is larger than a fourth threshold temperature in the operation status, the refrigeration cycle apparatus is configured to detect an abnormality at the expansion valve.

17. The refrigeration cycle apparatus of claim 11,
wherein the refrigeration cycle apparatus is configured to calculate a difference between a mean value of two or more temporally successive measurement values of any one or more of parameters and each of the measurement values, the parameters being a condensing temperature, a degree of subcooling in each of the indoor units, a temperature measured by the first temperature sensor, and a temperature measured by the second temperature sensor, and
wherein when the calculated difference lies within a predetermined reference value range, the refrigeration cycle apparatus is configured to perform abnormality detection for at least one of the expansion valve and the second valve.

18. The refrigeration cycle apparatus of claim 11, further comprising
at least one of a display and an audio output configured to provide notification of an abnormality at the valve.

19. The refrigeration cycle apparatus of claim 11, wherein the refrigerant flow switching valve is switchable at least to an operation mode in which operation is performed in the operation status.

20. A refrigeration cycle apparatus, comprising:
a refrigeration cycle circuit connecting a compressor, a refrigerant flow switching valve, an outdoor heat exchanger, an expansion valve, and an indoor heat exchanger, the refrigeration cycle circuit being configured to circulate refrigerant;
a first junction portion provided between the outdoor heat exchanger and the expansion valve, the first junction portion being configured to divide the refrigerant;
a second junction portion provided between the indoor heat exchanger and the refrigerant flow switching valve, the second junction portion being configured to divide the refrigerant;
a bypass pipe connecting the first junction portion and the second junction portion, the bypass pipe being configured to cause the refrigerant to flow through the bypass pipe;
a first valve provided between the second junction portion and the refrigerant flow switching valve;
a second valve provided to the bypass pipe;
a first temperature sensor configured to measure a temperature in a room to which air passing through the indoor heat exchanger is provided;
a second temperature sensor configured to measure a temperature of refrigerant at a liquid portion of the indoor heat exchanger; and
a third temperature sensor configured to measure a temperature of refrigerant at a gas portion of the indoor heat exchanger,
in an operation status in which the compressor operates, the indoor heat exchanger operates as a condenser, the first valve is closed, and the second valve is opened, the refrigeration cycle apparatus being configured to perform abnormality detection for the expansion valve, the first valve, and the second valve by using temperatures measured by the first temperature sensor, the second temperature sensor, and the third temperature sensor and a pressure of the refrigerant on a high-pressure side of the refrigeration cycle circuit, wherein
when the temperature measured by the second temperature sensor is equal to the temperature measured by the first temperature sensor in the operation status or when the temperature measured by the third temperature sensor is lower than a condensing temperature in the operation status, the refrigeration cycle apparatus is configured to detect an abnormality at the second valve.

* * * * *